United States Patent
Di et al.

(10) Patent No.: US 12,481,975 B2
(45) Date of Patent: Nov. 25, 2025

(54) METHOD FOR DISPLAYING TWO-DIMENSIONAL CODE AND ELECTRONIC DEVICE

(71) Applicant: Honor Device Co., Ltd., Shenzhen (CN)

(72) Inventors: Haoxuan Di, Shenzhen (CN); Cheng Zhang, Shenzhen (CN); Danhong Li, Shenzhen (CN); Xiaowu Zhang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/001,751

(22) PCT Filed: Aug. 19, 2022

(86) PCT No.: PCT/CN2022/113601
§ 371 (c)(1),
(2) Date: Jul. 6, 2023

(87) PCT Pub. No.: WO2023/124129
PCT Pub. Date: Jul. 6, 2023

(65) Prior Publication Data
US 2024/0127218 A1 Apr. 18, 2024

(30) Foreign Application Priority Data

Dec. 28, 2021 (CN) .......................... 202111633073.0
Jan. 28, 2022 (CN) .......................... 202210109243.3

(51) Int. Cl.
*G06Q 20/32* (2012.01)
*G06K 19/06* (2006.01)

(52) U.S. Cl.
CPC ... *G06Q 20/3274* (2013.01); *G06K 19/06037* (2013.01)

(58) Field of Classification Search
CPC .................... G06Q 20/3274; G06K 19/06037
(Continued)

(56) References Cited

U.S. PATENT DOCUMENTS 11,231,755 B2 * 1/2022 Liu .......................... G06F 21/32
11,699,104 B2   7/2023 Maalouf et al.
(Continued)

FOREIGN PATENT DOCUMENTS

CN    106384146 A    2/2017
CN    107037955 A    8/2017
(Continued)

OTHER PUBLICATIONS

Zhang, C., "Development of Automatic Water Level Monitor for Reservoir Based on Image Recognition", Jinan University, May 2019, 64 pages.
(Continued)

*Primary Examiner* — Hai Tran
(74) *Attorney, Agent, or Firm* — Conley Rose, P.C.

(57) ABSTRACT

Embodiments of this application provide a method for displaying a two-dimensional code and an electronic device. The method is performed by an electronic device, and includes: obtaining first sensor data, where the first sensor data is collected at a first moment; if it is determined, based on the first sensor data, that a first action of a user corresponding to the first moment is a preset action, determining whether the user performs a wrist turning action within a preset duration range starting from the first moment; and displaying a preset two-dimensional code page when the user performs a wrist turning action within the preset duration range. In the method, a process of presenting a two-dimensional code by the user can be simple and efficient.

20 Claims, 18 Drawing Sheets

(58) Field of Classification Search
USPC .......................................................... 705/39
See application file for complete search history.

(56) References Cited

U.S. PATENT DOCUMENTS

| | | | | |
|---|---|---|---|---|
| 2018/0314536 | A1* | 11/2018 | Wang | .................. G06Q 20/326 |
| 2021/0142214 | A1* | 5/2021 | Maalouf | .................. G06F 3/017 |
| 2021/0389873 | A1 | 12/2021 | Chen et al. | |

FOREIGN PATENT DOCUMENTS

| | | | | |
|---|---|---|---|---|
| CN | 107632758 | A | | 1/2018 |
| CN | 108762854 | A | | 11/2018 |
| CN | 109146463 | A | | 1/2019 |
| CN | 110032313 | A | | 7/2019 |
| CN | 110536004 | A | | 12/2019 |
| CN | 110554768 | A | | 12/2019 |
| CN | 110989852 | A | | 4/2020 |
| CN | 111593751 | A | | 8/2020 |
| CN | 111596751 | * | 8/2020 | ........... G06F 1/3265 |
| CN | 111596751 | A | | 8/2020 |
| CN | 111638841 | A | | 9/2020 |
| CN | 112783321 | A | | 5/2021 |
| CN | 113283493 | A | | 8/2021 |
| CN | 113572896 | * | 10/2021 | ........... G06F 18/214 |
| CN | 113572896 | A | | 10/2021 |
| JP | 2013132505 | A | | 7/2013 |
| WO | 2018058605 | A1 | | 4/2018 |

OTHER PUBLICATIONS

Kaixin, J., et al., "Health Monitoring System of the Lonely Old", Journal of Zhaoqing University, vol. 38, No. 5, Sep. 2017, 5 pages.

Zhang, Y., "Research on Factors Affecting User Experience of Smartphone Application Interface", Design 2017, 2 pages.

Li, J., et al., "Smartphone based car-searching system for large parking lot," 2016 IEEE 11th Conference on Industrial Electronics and Applications (ICIEA), Hefei, China, 2016, 5 pages.

Maekawa, T., et al., "Object-Based Activity Recognition with Heterogeneous Sensors on Wrist," International Conference on Pervasive Computing, Pervasive 2010, May 2010, 19 pages.

* cited by examiner

Portrait-mode wrist turning action

Landscape-mode wrist turning action

Wrist turning action performed through inversion

Wrist turning action performed at an inclination angle

METHOD FOR DISPLAYING TWO-DIMENSIONAL CODE AND ELECTRONIC DEVICE

CROSS-REFERENCE TO RELATED APPLICATIONS

This application is a U.S. National Stage of International Application No. PCT/CN2022/113601 filed on Aug. 19, 2022, which claims priority to Chinese Patent application Ser. No. 20111633073.0, filed with the China National Intellectual Property Administration on Dec. 28, 2021, and to Chinese Patent application Ser. No. 202210109243.3, filed with the China National Intellectual Property Administration on Jan. 28, 2022, all of which are incorporated herein by reference in their entireties.

TECHNICAL FIELD

This application relates to the field of electronic technologies, and in particular, to a method for displaying a two-dimensional code and an electronic device.

BACKGROUND

With wide application of electronic devices such as smartphones, increasingly more convenience is brought to people's lives. For example, to purchase an item, cash no longer needs to be carried, and a payment two-dimensional code in a mobile phone is directly used; or to take public transportation, a bus card no longer needs to be carried, and a two-dimensional code for bus taking in a mobile phone is directly used.

Currently, when needing to use a two-dimensional code to make a payment or take a bus, a user usually needs to first open a corresponding application (application, APP) on the mobile phone, and then open a two-dimensional code corresponding to the app. For example, in a payment scenario, an Alipay® app or a WeChat® app needs to be first opened, and then a "pay" option in the app is tapped to invoke a corresponding payment two-dimensional code. An operation step is relatively cumbersome and time-consuming.

SUMMARY

This application provides a method for displaying a two-dimensional code and an electronic device, to make a process of presenting a two-dimensional code by a user simple and efficient.

According to a first aspect, this application provides a method for displaying a two-dimensional code. The method is performed by an electronic device, and includes: obtaining first sensor data, where the first sensor data is collected at a first moment; if it is determined, based on the first sensor data, that a first action of a user corresponding to the first moment is a preset action, determining whether the user performs a wrist turning action within a preset duration range starting from the first moment; and displaying a preset two-dimensional code page when the user performs a wrist turning action within the preset duration range.

Optionally, the first sensor data may be data collected by at least one of a gyroscope sensor, an acceleration sensor, or a pressure sensor, for example, at least one of gyroscope signal data, acceleration signal data, or pressure signal data.

Optionally, the wrist turning action may include a post-extension wrist turning action, and the post-extension wrist turning action may include a portrait-mode wrist turning action, a landscape-mode wrist turning action, a wrist turning action performed through inversion, a wrist turning action performed at a specific inclination angle, or an inward wrist turning action performed by raising a hand.

When the first sensor data is obtained, the first moment (namely, a first collection moment) at which the data is collected may be further obtained. In this case, when it is determined that the gesture action of the user at the first collection moment is the preset action, it may be monitored, starting from the first collection moment, whether there is a wrist turning action within the preset duration range (for example, 3 seconds), and if there is a wrist turning action, the two-dimensional code page is displayed. In this implementation, the displayed two-dimensional code page may be a default two-dimensional code, for example, a payment two-dimensional code in Alipay®, or may be a two-dimensional code that is set by the user and that is frequently used by the user. For example, if a payment two-dimensional code in WeChat® is set, the payment two-dimensional code in WeChat® is displayed in this case.

In this implementation, when recognizing, based on the obtained sensor data, that the user performs the preset action, the electronic device monitors whether there is a wrist turning action within the preset duration range, and when there is a wrist turning action, determines to display a two-dimensional code, to reduce operation steps performed by the user to invoke the two-dimensional code, so that a process of presenting the two-dimensional code by the user is simple and efficient. In addition, the electronic device determines, with reference to both the preset action and the wrist turning action of the user, to display the corresponding two-dimensional code, and therefore accuracy of a result of determining, by the electronic device, whether to display the two-dimensional code can be improved.

With reference to the first aspect, in some implementations of the first aspect, the determining whether the user performs a wrist turning action within a preset duration range starting from the first moment includes: obtaining second sensor data, where the second sensor data is collected at a second moment, and the second moment falls within the preset duration range after the first moment; and determining, based on the second sensor data, whether a second action of the user corresponding to the second moment is a wrist turning action.

The second sensor data may include gyroscope signal data and acceleration signal data, and a moment at which the second sensor data is collected is denoted as the second moment (namely, a second collection moment). The second collection moment falls within the preset duration range after the first collection moment, that is, the electronic device analyzes the sensor data within the preset duration range after the first collection moment, to determine whether the user performs a wrist turning action within the duration range. Therefore, when determining that there is a wrist turning action, the electronic device may display the two-dimensional code page, to improve efficiency of presenting the two-dimensional code by the user.

With reference to the first aspect, in some implementations of the first aspect, the determining, based on the second sensor data, whether a second action of the user corresponding to the second moment is a wrist turning action includes: preprocessing the second sensor data to determine whether the second action is a suspected wrist turning action, where a probability that the suspected wrist turning action is a wrist turning action is greater than or equal to a preset probability threshold; and when the second action is a suspected wrist turning action, determining whether the second action is a wrist turning action.

When analyzing the second sensor data, the electronic device may first preprocess the second sensor data to determine whether there is a corresponding suspected wrist turning action, and when there is a suspected wrist turning action, further determine whether there is a post-extension wrist turning action. Therefore, the electronic device first selects a suspected wrist turning action that is more likely to be a wrist turning action, and then determines whether the suspected wrist turning action is a real wrist turning action, to improve accuracy of a final recognition result.

With reference to the first aspect, in some implementations of the first aspect, the second sensor data includes gyroscope signal data and acceleration signal data, and the preprocessing the second sensor data to determine whether the second action is a suspected wrist turning action includes: obtaining first sub-data from the gyroscope signal data, where the first sub-data is a preset quantity of consecutive frames of data in the gyroscope signal data; obtaining second sub-data from the acceleration signal data, where the second sub-data is a preset quantity of consecutive frames of signals in the acceleration signal data, and a location of the first sub-data in the gyroscope signal data is the same as a location of the second sub-data in the acceleration signal data; and if the first sub-data and the second sub-data meet a first preset condition, determining that the second action is a suspected wrist turning action.

The electronic device may use a first frame of signal in the second sensor data as a starting point, and select 100 frames of signals as the first sub-data; then use a first frame of signal in the third sensor data as a starting point, and select 100 frames of signals as the second sub-data; determine whether the first sub-data and the second sub-data meet the first preset condition; and if the first sub-data and the second sub-data meet the first preset condition, determine that the second action is a suspected wrist turning action. If the first sub-data and the second sub-data do meet the first preset condition, a second frame of signal in the second sensor data is used as a starting point, and 100 frames of signals are selected as the first sub-data; a second frame of signal in the third sensor data is used as a starting point, and 100 frames of signals are selected as the second sub-data; and determining is performed again, and so on.

Optionally, the first preset condition includes at least one of the following conditions:
a condition 1 in which an angular velocity modulus value corresponding to a last frame of signal in the first sub-data falls within a first interval;
a condition 2 in which an acceleration modulus value corresponding to a last frame of signal in the second sub-data falls within a second interval;
a condition 3 in which a z-axis acceleration value corresponding to the last frame of signal in the second sub-data falls within a third interval or is less than a first threshold;
a condition 4 in which there is a main peak signal in the first sub-data;
a condition 5 in which the main peak signal is located in an intermediate region of the first sub-data; and
a condition 6 in which there is a monotonically increasing trend for signal distribution before the main peak signal and a monotonically decreasing trend for signal distribution after the main peak, or there is a monotonically decreasing trend for signal distribution before the main peak signal and a monotonically increasing trend for signal distribution after the main peak.

The first interval may be an interval [N1, N2], for example, 10, 31. The second interval may be an interval [N3, N4], for example, [0.8, 1.2]. The third interval may be an interval [N5, N6], for example, [−0.707, 0.707]. The first threshold may be −0.707. Therefore, it is determined, through selection by using the first preset condition, whether a gesture action corresponding to the first sub-data and the second sub-data is a wrist turning action, to improve accuracy of a final recognition result.

With reference to the first aspect, in some implementations of the first aspect, the determining whether the second action is a wrist turning action includes: recognizing the first sub-data and the second sub-data by using a preset first model, to obtain a first recognition result; and when the first recognition result is a first preset result, determining that the second action is a wrist turning action.

The first model may be any one of a recurrent neural network (recurrent neural network, RNN) model, a long short-term memory (long short-term memory, LSTM) model, and a gated recurrent unit (gated recurrent unit, GRU) model. After determining that the second action is a suspected wrist turning action, the electronic device may continue to process the first sub-data and the second sub-data, for example, may perform feature extraction on the first sub-data and the second sub-data, to obtain a feature set, and then input the feature set to the first model, to obtain the first recognition result. Optionally, in the first recognition result, 0 may be used to represent a non-wrist turning action, 1 may be used to represent a post-extension wrist turning action, and 2 may be used to represent a post-withdrawal wrist turning action. In this case, when the first recognition result is 1, it may be determined that the second action is a post-extension wrist turning action. Therefore, the electronic device first selects a suspected wrist turning action that is more likely to be a wrist turning action, and then determines whether the suspected wrist turning action is a real wrist turning action, to improve accuracy of a final recognition result.

With reference to the first aspect, in some implementations of the first aspect, the determining, based on the first sensor data, that a first action of a user corresponding to the first moment is a preset action includes: recognizing the first sensor data by using a preset second model, to obtain a second recognition result; and when the second recognition result is a second preset result, determining that the first action is the preset action.

Optionally, the preset action may include a double-tap action or a triple-tap action performed by the user on a back of the electronic device or a shaking action performed by the user by holding the electronic device.

The second model may be a decision tree model, and the first sensor data is recognized by using the second model, to obtain the second recognition result. Optionally, in the second recognition result, 0 may be used to represent a non-gesture action, 1 may be used to represent a double-tap action performed on the back of the electronic device, 2 may be used to represent a triple-tap action performed on the back of the electronic device, and 3 may be used to represent a shaking action performed by holding the electronic device. In this case, when the second recognition result is 1, 2, or 3, it may be determined that the first action is the preset action. Therefore, the first sensor data is determined by using the model, to improve accuracy of the recognition result.

With reference to the first aspect, in some implementations of the first aspect, the displaying a preset two-dimensional code page includes: displaying a first two-dimensional code page if the first action is a double-tap action performed by the user on the back of the electronic device; displaying a second two-dimensional code page if the first action is a triple-tap action performed by the user on the back of the electronic device; or displaying a third two-dimensional code page if the first action is a shaking action performed by the user by holding the electronic device.

With reference to the first aspect, in some implementations of the first aspect, the method further includes: displaying a first interface that includes a display settings control, where the display settings control includes a settings control for the double-tap action, a settings control for the triple-tap action, and a settings control for the shaking action; receiving a first operation that is performed by the user on the first interface and that acts on the display settings control; and in response to the first operation, setting that the first two-dimensional code page is displayed when the user performs a double-tap action on the back of the electronic device, the second two-dimensional code page is displayed when the user performs a triple-tap action on the back of the electronic device, and the third two-dimensional code page is displayed when the user performs a shaking action on the electronic device.

The electronic device may provide different gesture actions for the user to display different two-dimensional code pages. In this case, when the user wants to present a two-dimensional code page, only a corresponding gesture action needs to be performed. For example, it is set that the double-tap action performed on the back of the electronic device corresponds to the payment two-dimensional code in Alipay®, the triple-tap action performed on the back of the electronic device corresponds to the payment two-dimensional code in WeChat®, and the shaking action performed by holding the electronic device corresponds to a health code. In addition, the electronic device may further provide an operation interface (namely, the first interface) for the user to perform settings, so that the user performs a corresponding settings operation for a different requirement, to improve user experience.

With reference to the first aspect, in some implementations of the first aspect, after the displaying a preset two-dimensional code page, the method further includes: obtaining third sensor data; processing the third sensor data to obtain a third recognition result; and displaying a first page when the third recognition result represents that a third action of the user corresponding to the third sensor data is a post-withdrawal wrist turning action, where the first page is a page displayed before the electronic device displays the two-dimensional code page.

The electronic device continuously obtains the gyroscope signal data and the acceleration signal data, and recognizes the gyroscope signal data and the acceleration signal data. Therefore, there is a moment at which a wrist turning action recognition result obtained by the electronic device is 2 (in other words, the third recognition result represents that the third action is a post-withdrawal wrist turning action). In this scenario, the electronic device may obtain data of a picture currently displayed on a display from a video memory. If the two-dimensional code page is currently displayed, the electronic device may close the two-dimensional code page, and display any other page (namely, the first page) displayed before the two-dimensional code page is displayed. Therefore, after the user performs code scanning and withdraws the electronic device, the electronic device may automatically close the two-dimensional code page, to improve simplicity of a process of closing the two-dimensional code by the user.

According to a second aspect, this application provides an apparatus. The apparatus is included in an electronic device, and the apparatus has a function of implementing actions of the electronic device in the first aspect and the possible implementations of the first aspect. The function may be implemented by hardware, or may be implemented by hardware by executing corresponding software. The hardware or the software includes one or more modules or units corresponding to the function, for example, a receiving module or unit or a processing module or unit.

According to a third aspect, this application provides an electronic device. The electronic device includes a processor, a memory, and an interface. The processor, the memory, and the interface cooperate with each other, so that the electronic device performs any one of the methods in the technical solutions in the first aspect.

According to a fourth aspect, this application provides a chip that includes a processor. The processor is configured to read and execute a computer program stored in a memory, to perform the method in any one of the first aspect and the possible implementations of the first aspect.

Optionally, the chip further includes the memory, and the memory is connected to the processor by using a circuit or a wire.

Further, optionally, the chip further includes a communications interface.

According to a fifth aspect, this application provides a computer-readable storage medium. The computer-readable storage medium includes a computer program, and when the computer program is executed by a processor, the processor is enabled to perform any one of the methods in the technical solutions in the first aspect.

According to a sixth aspect, this application provides a computer program product. The computer program product includes computer program code, and when the computer program code is run on an electronic device, the electronic device is enabled to perform any one of the methods in the technical solutions in the first aspect.

DESCRIPTION OF EMBODIMENTS

The technical solutions in the embodiments of this application are described below with reference to the accompanying drawings in the embodiments of this application. In the description of the embodiments of this application, unless otherwise specified, "/" means "or". For example, A/B may mean A or B. "And/Or" in this specification is merely an association relationship for describing associated objects, and represents that three relationships may exist. For example, A and/or B may represent the following three cases: Only A exists, both A and B exist, and only B exists. In addition, in the description of the embodiments of this application. "a plurality of" means two or more.

The following terms "first", "second", and "third" are merely used for description, and should not be understood as an indication or an implication of relative importance or an implicit indication of a quantity of indicated technical features. Therefore, a feature defined by "first", "second", or "third" may explicitly or implicitly include one or more features.

Figure 1:
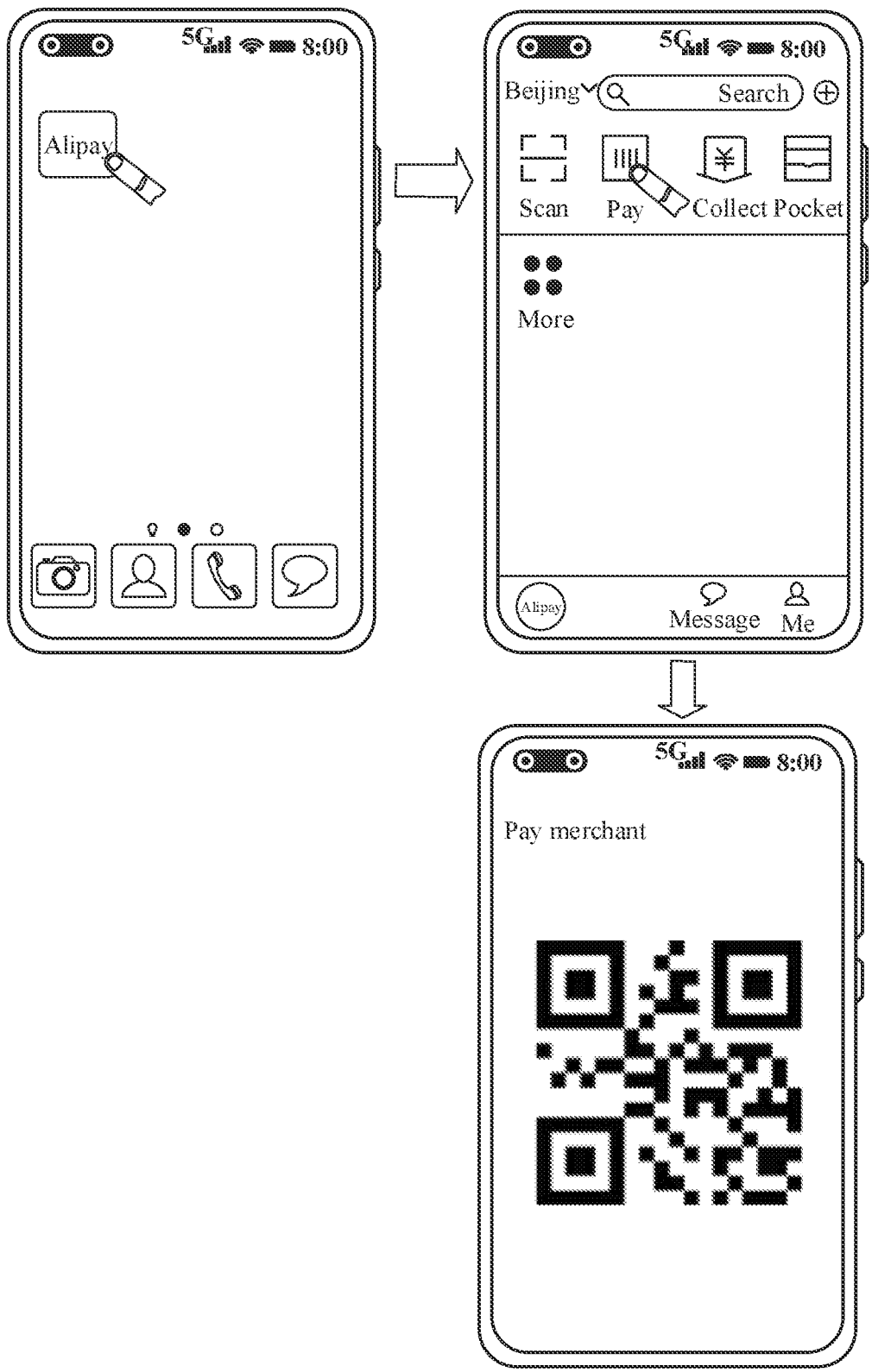
FIG. 1 is a schematic diagram of a process of presenting a two-dimensional code page in a related technology.

Currently, there are increasingly more types of electronic devices. For example, the electronic device is a mobile phone, and a plurality of apps such as an Alipay® app, a WeChat® app, and a health code app may be installed in the mobile phone. If a user currently needs to make a payment by using Alipay®, as shown in FIG. 1, the user may tap an icon of Alipay® to enter an application interface, and then tap a "pay" option on the application interface, and a payment two-dimensional code in Alipay® is displayed on a display interface of the mobile phone. In this case, the user may align the payment two-dimensional code with a code scanning port provided by a merchant, to make a payment through code scanning. After the payment ends, the user further needs to close a page of the payment two-dimensional code or close the Alipay® app. For another type of app, a similar operation step needs to be performed when the user wants to use a two-dimensional code in the app. Therefore, it may be learned that the operation step currently performed by the user to invoke the two-dimensional code is relatively cumbersome and time-consuming.

In view of this, the embodiments of this application provide a method for displaying a two-dimensional code. A gesture action performed by a user to perform an operation on a mobile phone may be recognized to determine whether a two-dimensional code needs to be displayed, and when it is determined to display a two-dimensional code, a corresponding two-dimensional code page may be displayed, to reduce operation steps performed by the user to invoke the two-dimensional code, so that a process of presenting the two-dimensional code by the user is simple and efficient. It should be noted that the method for displaying a two-dimensional code provided in the embodiments of this application may be applied to an electronic device in which an app may be installed or that has a corresponding two-dimensional code function, for example, a mobile phone, a tablet computer, or a wearable device. A specific type of the electronic device is not limited in the embodiments of this application.

Figure 2:
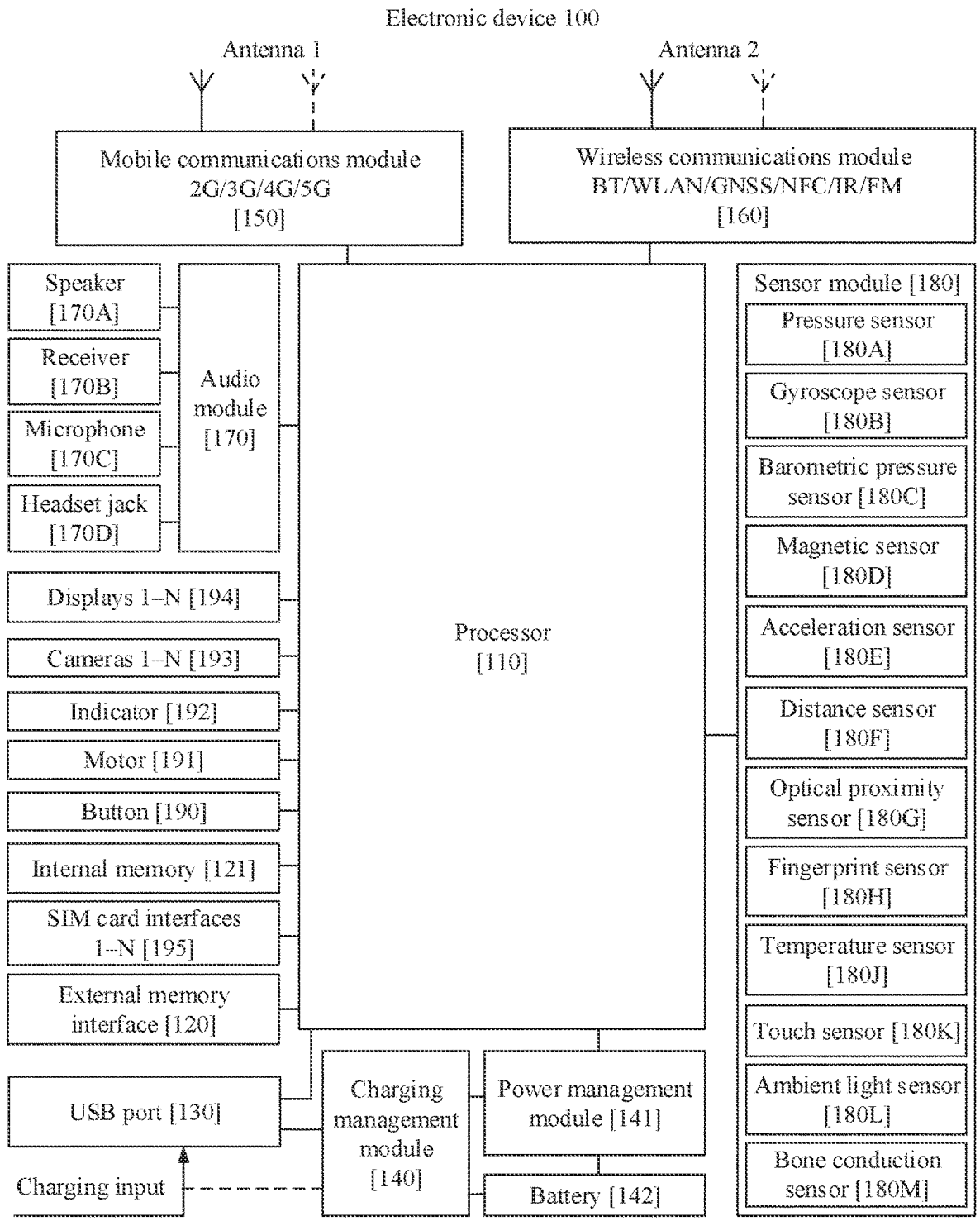
FIG. 2 is a schematic diagram of a structure of an electronic device according to an embodiment of this application.

For example, FIG. 2 is a schematic diagram of a structure of an electronic device 100 according to an embodiment of this application. The electronic device 100 may include a processor 110, an external memory interface 120, an internal memory 121, a universal serial bus (universal serial bus, USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent devices, or may be integrated into one or more processors.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) port, and/or the like.

It may be understood that an interface connection relationship between the modules shown in this embodiment of this application is merely an example for description, and constitutes no limitation on the structure of the electronic device 100. In some other embodiments of this application, an interface connection manner or a combination of a plurality of interface connection manners different from that in the foregoing embodiment may be used for the electronic device 100.

A wireless communication function of the electronic device 100 may be implemented by using the antenna 1, the antenna 2, the mobile communications module 150, the wireless communications module 160, the modem processor, the baseband processor, and the like. The antenna 1 and the antenna 2 are configured to transmit and receive an electromagnetic wave signal. Structures of the antenna 1 and the antenna 2 in FIG. 2 are merely examples. Each antenna in the electronic device 100 may be configured to cover one or more communication bands. Different antennas may be multiplexed to improve antenna utilization. For example, the antenna 1 may be multiplexed as a diversity antenna in a wireless local area network. In some other embodiments, the antenna may be used in combination with a tuning switch.

The electronic device 100 implements a display function by using the GPU, the display 194, the application processor, and the like. The GPU is a microprocessor for image processing, and is connected to the display 194 and the application processor. The GPU is configured to perform mathematical and geometric calculation, and is configured to perform graphics rendering. The processor 110 may include one or more GPUs, and the processor 110 executes program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a mini LED, a micro LED, a micro OLED, a quantum dot light emitting diode (quantum dot light emitting diodes, QLED), or the like. In some embodiments, the electronic device 100 may include one or N displays 194, where N is a positive integer greater than 1.

The pressure sensor 180A is configured to sense a pressure signal, and may convert the pressure signal into an electrical signal. In some embodiments, the pressure sensor 180A may be disposed on the display 194. There are many types of pressure sensors 180A, for example, a resistive pressure sensor, an inductive pressure sensor, and a capacitive pressure sensor. The capacitive pressure sensor may include at least two parallel plates made of conductive materials. When force is applied to the pressure sensor 180A, capacitance between electrodes changes. The electronic device 100 determines strength of pressure based on a change of the capacitance. When a touch operation acts on the display 194, the electronic device 100 detects touch operation strength by using the pressure sensor 180A. The electronic device 100 may further calculate a touch position based on a detection signal of the pressure sensor 180A. In some embodiments, touch operations that act on a same touch position but have different touch operation strength may correspond to different operation instructions. For example, when a touch operation whose touch operation strength is less than a first pressure threshold acts on a messaging application icon, an instruction of viewing an SMS message is executed. When a touch operation whose touch operation strength is greater than or equal to the first pressure threshold acts on the messaging application icon, an instruction of creating a new SMS message is executed.

The gyroscope sensor 180B may be configured to determine a motion posture of the electronic device 100. In some embodiments, angular velocities of the electronic device 100 around three axes (namely, an x axis, a y axis, and a z axis) may be determined by using the gyroscope sensor 180B. The gyroscope sensor 180B may be configured to perform image stabilization during photographing. For example, when a shutter is pressed, the gyroscope sensor 180B detects a jittering angle of the electronic device 100, calculates, based on the angle, a distance for which a lens module needs to compensate, and enables a lens to offset jittering of the electronic device 100 through reverse motion, to implement image stabilization. The gyroscope sensor 180B may be further used for a navigation scenario and a motion sensing game scenario.

The acceleration sensor 180E may detect magnitudes of acceleration of the electronic device 100 in various directions (usually on three axes). A magnitude and a direction of gravity may be detected when the electronic device 100 is static. The acceleration sensor 180E may be further configured to recognize a posture of the electronic device, and is applied to an application such as switching between a landscape mode and a portrait mode or a pedometer.

The optical proximity sensor 180G may include, for example, a light-emitting diode (LED) and an optical detector, for example, a photodiode. The light-emitting diode may be an infrared light-emitting diode. The electronic device 100 emits infrared light by using the light-emitting diode. The electronic device 100 detects infrared reflected light from a nearby object by using the photodiode. When sufficient reflected light is detected, it may be determined that there is an object near the electronic device 100. When insufficient reflected light is detected, the electronic device 100 may determine that there is no object near the electronic device 100. The electronic device 100 may detect, by using the optical proximity sensor 180G, that a user holds the electronic device 100 close to an ear for making a call, to automatically turn off a screen, so as to save power. The optical proximity sensor 180G may be further used in a holster mode and a pocket mode to automatically unlock or lock the screen.

In an embodiment, the electronic device 100 further includes a sensor hub (Sensor Hub). The sensor hub may be referred to as a sensor hub or a sensor coprocessor, and the sensor hub is primarily connected and processes data from the sensor module 180 with low power consumption. The sensor hub may include but is not limited to a processing module or a processing circuit with low power consumption, for example, an application processor, a coprocessor (Co-processor), or a micro-programmed control unit (micro-programmed control unit, MCU). Usually, the sensor hub may process data from sensors such as the pressure sensor 180A, the gyroscope sensor 180B, the barometric pressure sensor 180C, the magnetic sensor 180D, the acceleration sensor 180E, the distance sensor 180F, the optical proximity sensor 180G, the fingerprint sensor 180H, the temperature sensor 180J, the touch sensor 180K, the ambient light sensor 180L, and the bone conduction sensor 180M, and fuse the data from the sensors.

Based on different electronic devices and different service scenario requirements, currently, there are mainly three types of sensor hubs: a sensor hub that is used as a separate chip and is placed between an application processor and various sensors; a sensor hub that is combined with various sensors, receives data from the various sensors for fusion, and provides data obtained after fusion processing to an application processor; and a sensor hub that is integrated into an application processor, receives data provided by various sensors, fuses the data, and provides the data to the application processor.

It may be understood that the structure shown in this embodiment of this application constitutes no specific limitation on the electronic device 100. In some other embodiments of this application, the electronic device 100 may include more or fewer components than those shown in the figure, combine some components, split some components, or have different component arrangements. The component shown in the figure may be implemented by hardware, software, or a combination of software and hardware.

Figure 3:
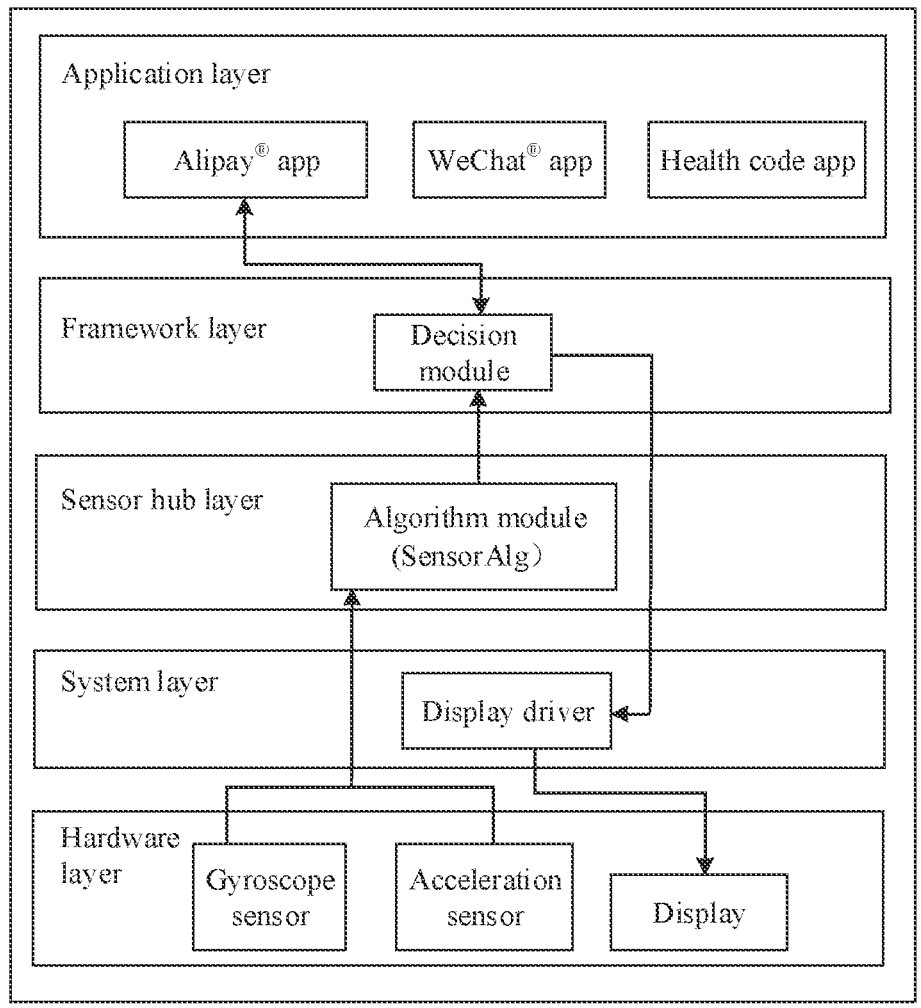
FIG. 3 is a block diagram of a software structure of an electronic device according to an embodiment of this application.

FIG. 3 is a block diagram of a software structure of an electronic device 100 according to an embodiment of this application. In a layered architecture, software is divided into several layers, and each layer has a clear role and task. Layers communicate with each other through a software interface. In some embodiments, an Android system may be divided into several layers that are respectively an application layer, a framework layer, a sensor hub layer, a system layer, and a hardware layer from top to bottom.

As shown in FIG. 3, the application layer may include various applications installed in the electronic device 100, for example, an Alipay® app, a WeChat® app, and a health code app. The framework layer may include a decision module, configured to: make an instruction decision based on data transmitted by an upper layer or a lower layer, and indicate the upper layer or the lower layer to perform a corresponding instruction action. An algorithm module at the sensor hub layer is configured to: invoke a sensor algorithm (SensorAlg) to process sensor data of a sensor at the hardware layer, and transfer a processing result to the decision module for decision-making. A display driver at the system layer may receive display data transmitted by an upper layer, and transfer the data to a display for display. The hardware layer may include various hardware modules in the electronic device 100, for example, a gyroscope sensor, an acceleration sensor, and the display.

For ease of understanding, in the following embodiments of this application, the method for displaying a two-dimensional code provided in the embodiments of this application is described in detail by using an electronic device having the structures shown in FIG. 2 and FIG. 3 as an example and with reference to the accompanying drawings and application scenarios.

Figure 4:
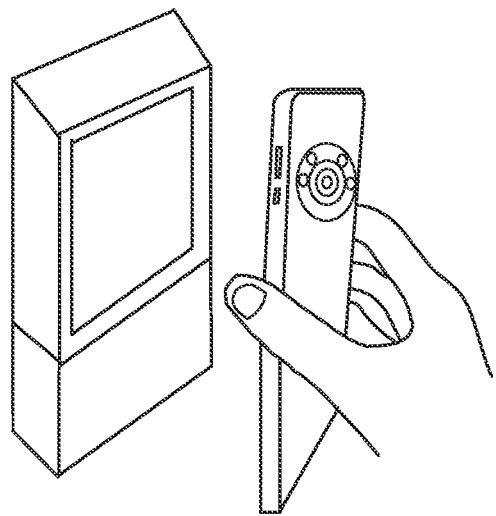
FIG. 4 is a schematic diagram of wrist turning actions in a code scanning scenario according to an embodiment of this application.
Figure 4:
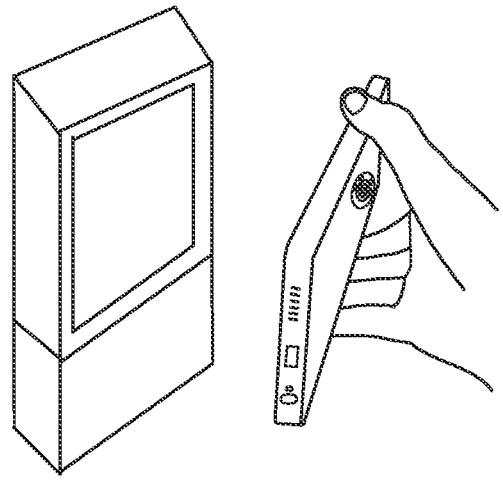
Figure 4:
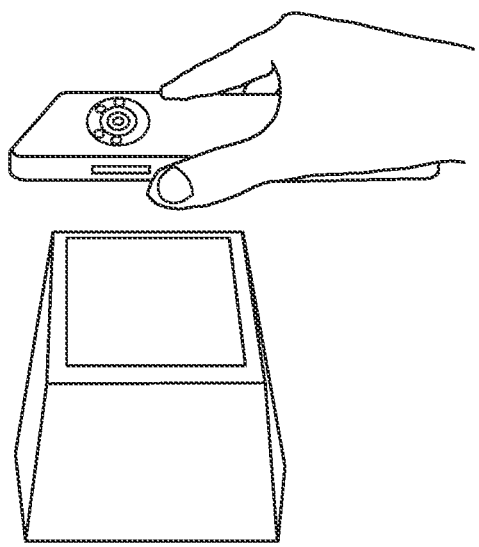
Figure 4:
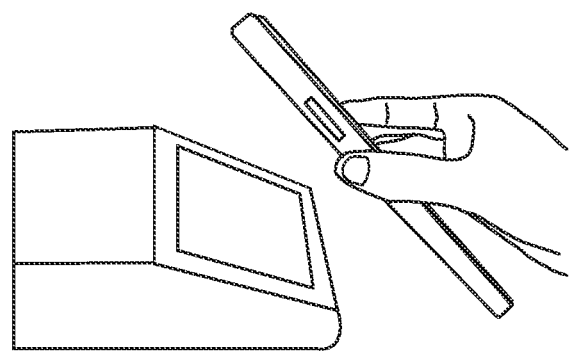

When a user aligns an invoked two-dimensional code with a code scanning port provided by a merchant, to perform code scanning, usually, as shown in FIG. 4, the code scanning port provided by the merchant may be in a vertical direction and face forward, may be in a horizontal direction and face upward, or may be inclined and face upward. In this case, the user needs to vertically or horizontally place, invert, or incline a display of an electronic device, to align with the code scanning port. Therefore, in the embodiments of this application, sensor data of a gyroscope sensor and sensor data of an acceleration sensor in the electronic device are analyzed based on a gesture action performed by the user to perform an operation on the mobile phone during code scanning, to determine whether the user performs a wrist turning action corresponding to code scanning, for example, a portrait-mode wrist turning action, a landscape-mode wrist turning action, a wrist turning action performed through inversion, or a wrist turning action performed at a specific inclination angle shown in FIG. 4. When determining that the user performs the wrist turning action, the electronic device may automatically pop up and display a corresponding two-dimensional code. In the embodiments of this application, an action of turning a wrist when the user holds the electronic device is referred to as the wrist turning action. The portrait-mode wrist turning action, the landscape-mode wrist turning action, the wrist turning action performed through inversion, or the wrist turning action performed at a specific inclination angle is referred to as a post-extension wrist turning action. An action that is of performing withdrawal and wrist turning and that is performed after the post-extension wrist turning action is referred to as a post-withdrawal wrist turning action. In addition, the user may further perform an inward wrist turning action by raising a hand (for example, an action of raising the hand to view a screen of the electronic device) and the like. These actions may also be referred to as post-extension wrist turning actions. In the following embodiments, the method for displaying a two-dimensional code is described by using the post-extension wrist turning action as an example.

Figure 5A:
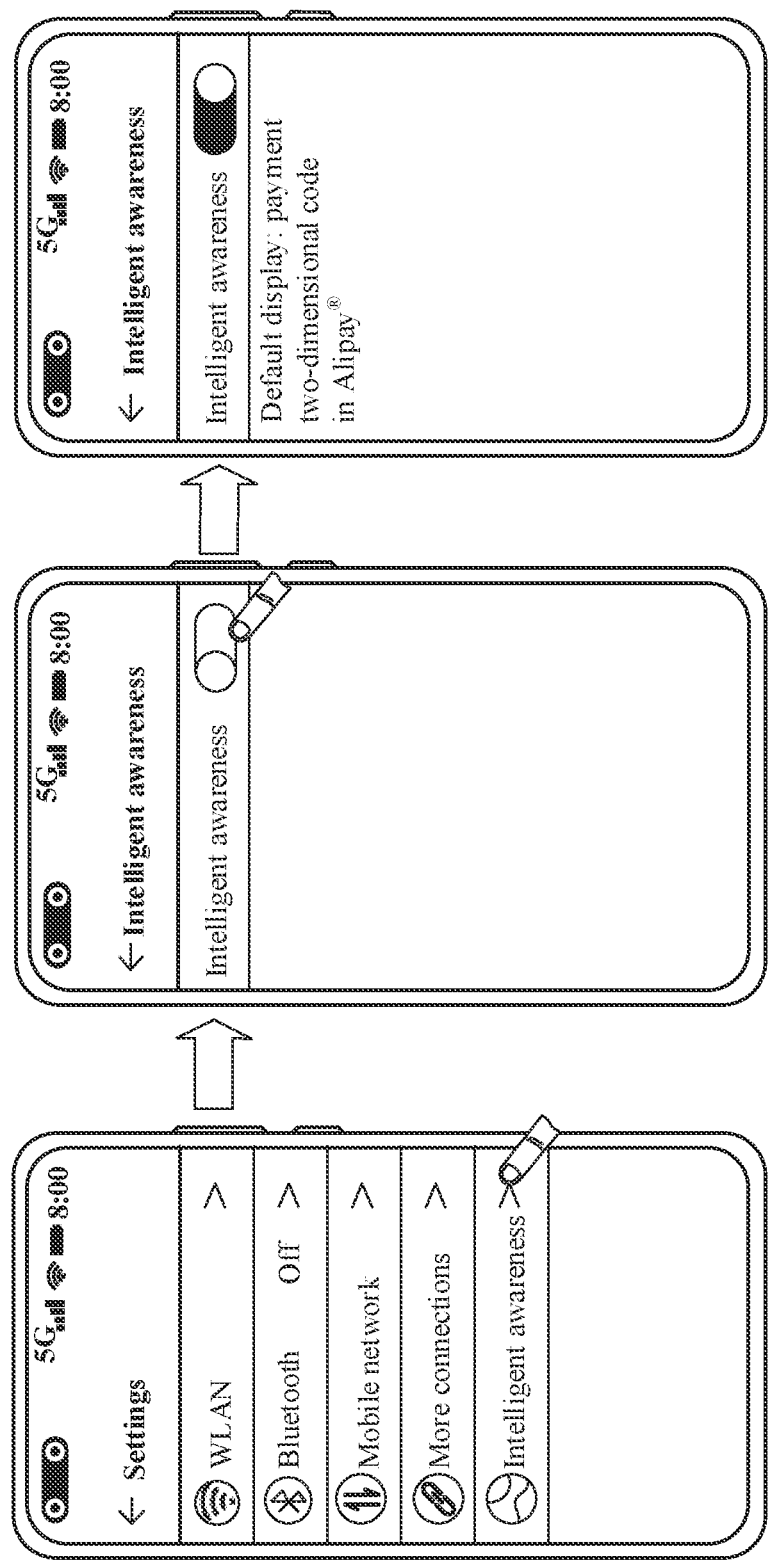
FIG. 5(a) is a schematic diagram of an operation interface for enabling an intelligent awareness function according to an embodiment of this application.
Figure 5B:
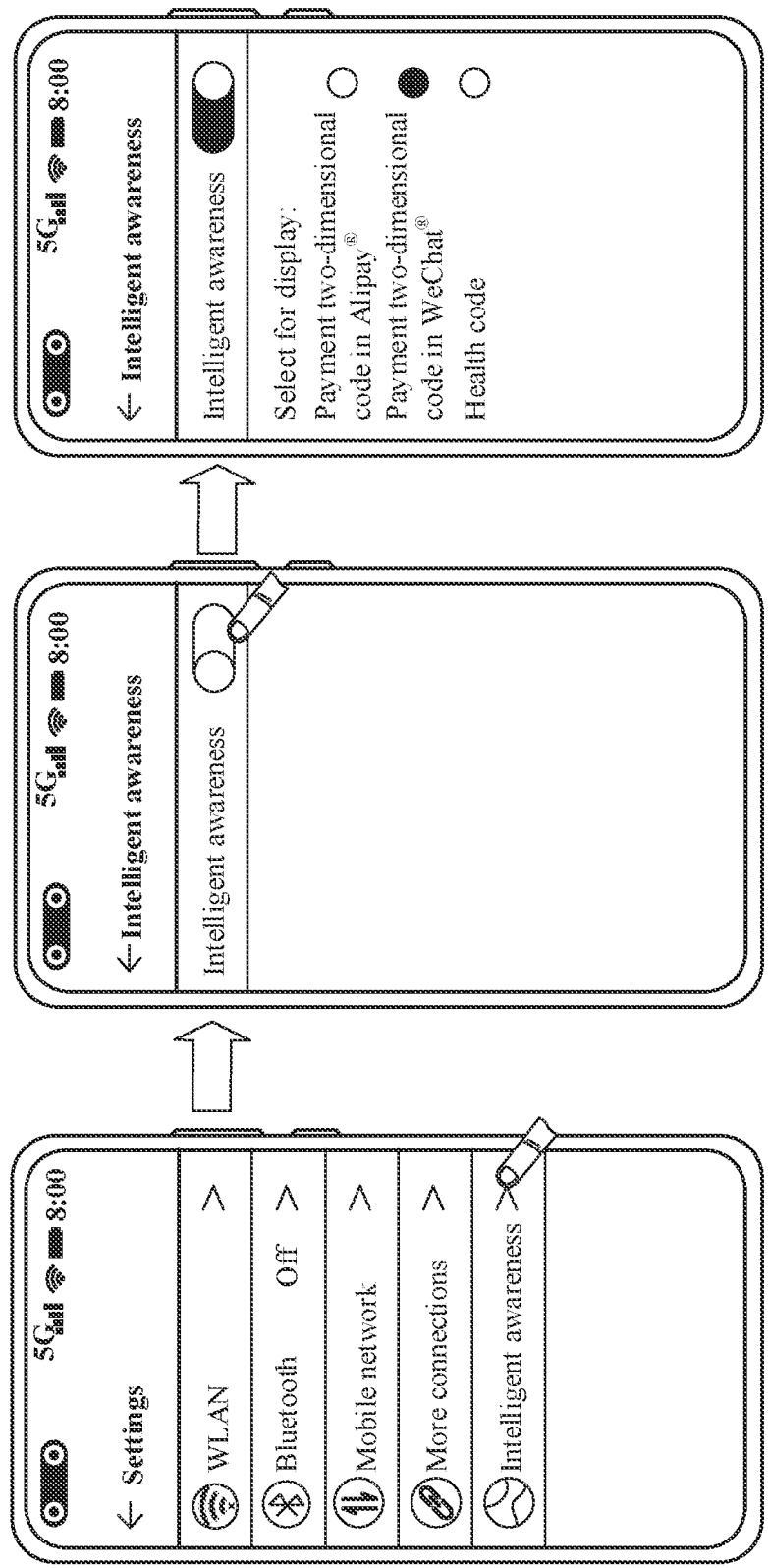
FIG. 5(b) is another schematic diagram of an operation interface for enabling an intelligent awareness function according to an embodiment of this application.

A function of automatically popping up and displaying a two-dimensional code by the electronic device may be set by the user through customization. If the user wants to use the function, a switch of the function may be turned on through a settings path. As shown in FIG. 5(a) and FIG. 5(b), there is an "intelligent awareness" option on a settings interface. After the user taps the option, a jump to a switch page of an intelligent awareness function (namely, the function of automatically popping up and displaying a two-dimensional code by the electronic device) may be made. On the page, the user may tap a switch control to enable the intelligent awareness function. In an embodiment, as shown in FIG. 5(a), when the user enables the function, there is a corresponding default two-dimensional code, for example, a corresponding payment two-dimensional code in Alipay®. In this case, the electronic device subsequently automatically pops up and displays the payment two-dimensional code in Alipay®. In an embodiment, as shown in FIG. 5(b), when the user enables the function, a two-dimensional code frequently used by the user may be selected as a two-dimensional code that is automatically popped up and displayed by the electronic device. For example, if a payment two-dimensional code in WeChat® is selected, the electronic device subsequently automatically pops up and displays the payment two-dimensional code in WeChat®.

Figure 6:
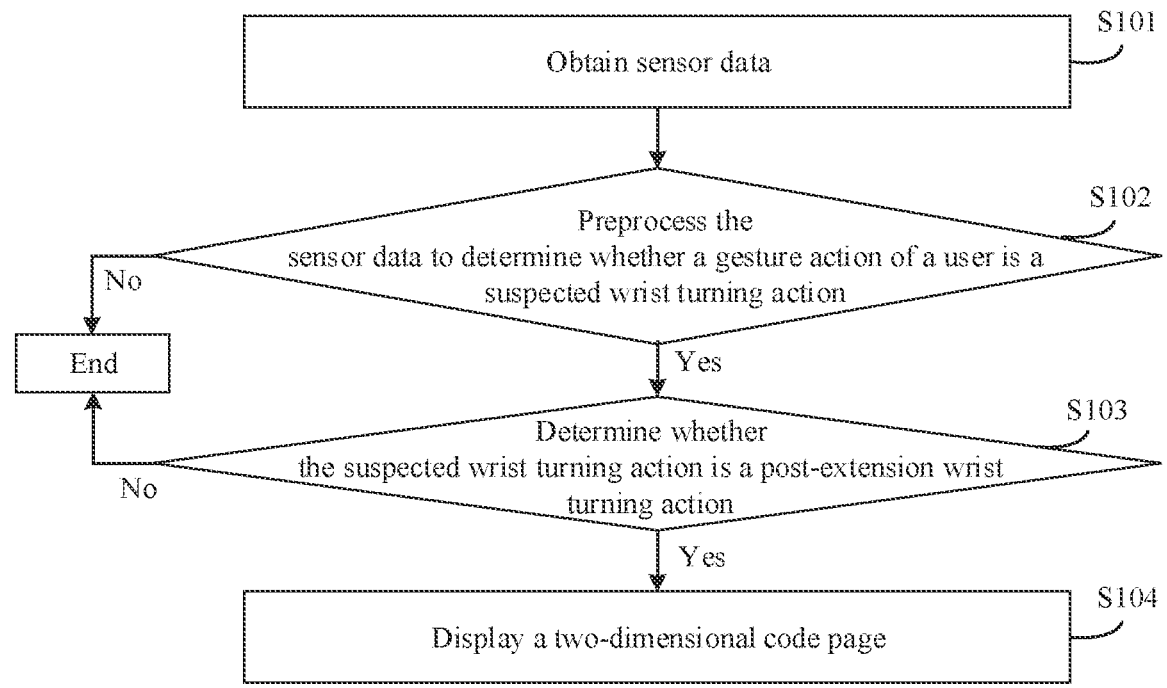
FIG. 6 is a schematic flowchart of a method for displaying a two-dimensional code according to an embodiment of this application.

After the user enables the function of the electronic device, the electronic device may continuously obtain the sensor data of the gyroscope sensor and the sensor data of the acceleration sensor, to determine whether the user performs a wrist turning action corresponding to code scanning, and then display a corresponding two-dimensional code. Specifically, FIG. 6 is a schematic flowchart of a method for displaying a two-dimensional code according to an embodiment of this application. The method is performed by an electronic device, and includes the following steps.

S101. Obtain sensor data.

Optionally, the sensor data may include sensor data A and sensor data B. The sensor data A may be data collected by a gyroscope sensor, for example, gyroscope signal data The sensor data B may be data collected by an acceleration sensor, for example, acceleration signal data. The gyroscope signal data is usually angular velocities, on three axes (namely, an x axis, a v axis, and a z axis), that exist when the electronic device moves. The three axes herein are coordinate axes of a coordinate system of the gyroscope sensor. The acceleration signal data is usually acceleration, on three axes (namely, an x axis, a y axis, and a z axis), that exists when the electronic device moves. The three axes herein are coordinate axes of a coordinate system of the acceleration sensor. For example, for a signal distribution diagram of the gyroscope signal data and the acceleration signal data obtained by the electronic device, refer to FIG. 7. In a schematic diagram of the gyroscope signal data in FIG. 7, a horizontal axis represents a quantity of signal frames, and a vertical axis represents an amplitude of an angular velocity, on each of the x axis, the y axis, and the z axis, that corresponds to each frame of signal. In a schematic diagram of the acceleration signal data in FIG. 7, a horizontal axis represents a quantity of signal frames, and a vertical axis represents an amplitude of acceleration, on each of the x axis, the y axis, and the z axis, that corresponds to each frame of signal.

It should be noted that the electronic device continuously obtains the sensor data at a specific frequency, and continuously performs a process in the following steps when obtaining the sensor data. In an embodiment, a user usually has a requirement of presenting a two-dimensional code only after the electronic device is unlocked, and therefore the electronic device may obtain the sensor data A and the sensor data B when in an unlocked screen-on state.

S102. Preprocess the sensor data to determine whether a gesture action of the user is a suspected wrist turning action. If the gesture action of the user is a suspected wrist turning action, S103 is performed.

The suspected wrist turning action may be understood as that a probability that the suspected wrist turning action is determined as a wrist turning action is greater than or equal to a preset probability threshold (for example, 90%). In this embodiment, the electronic device may preprocess the sensor data, for example, the sensor data A and the sensor data B, for example, select first sub-data in the sensor data A and second sub-data in the sensor data B, to determine, based on the first sub-data and the second sub-data, whether the corresponding gesture action of the user is a suspected wrist turning action. In other words, the electronic device first selects a suspected wrist turning action that is more likely to be a wrist turning action, and then subsequently determines whether the suspected wrist turning action is a real wrist turning action, to improve accuracy of a final recognition result.

A process in which the electronic device determines whether the gesture action of the user is a suspected wrist turning action may be as follows:

An example in which the sensor data A is gyroscope signal data and the sensor data B is acceleration signal data is used. In this case, after obtaining the gyroscope signal data and the acceleration signal data, the electronic device may first filter the gyroscope signal data and the acceleration signal data, to remove noise in the signal data. In an embodiment, the electronic device may filter the gyroscope signal data and the acceleration signal data by using a mean filtering method or another filtering method. After obtaining filtered gyroscope signal data and filtered acceleration signal data, the electronic device may analyze the gyroscope signal data and the acceleration signal data, to determine whether there is a suspected wrist turning action.

In an implementable manner, the electronic device may determine, in the following manner, whether there is a suspected wrist turning action: For the gyroscope signal data, the electronic device uses a first frame of signal as a starting point, and selects a preset quantity of frames (for example, 100 frames, namely, signal data in 1 second) of signals as a first signal segment A (namely, the first sub-data). For the acceleration signal data, the electronic device also uses a first frame of signal as a starting point, and selects 100 frames of signals as a first signal segment B (namely, the second sub-data). The electronic device analyzes and determines the first signal segment A and the first signal segment B. A specific analysis process may be as follows:

When the user holds the electronic device to perform code scanning, the electronic device is in a relatively static state. Therefore, the electronic device selects a last frame of signal in the first signal segment. If a three-axis angular velocity radian value corresponding to a last frame of signal in the first signal segment A is (x1, y1, z1), and is in a unit of rad/s, the electronic device may calculate a modulus value M1 of the gyroscope three-axis angular velocity radian value based on (x1, y1, z1), for example, may calculate M1 based on a relational expression $M1=x1^2+y1^2+z1^2$, and then determine whether M1 falls within an interval [N1, N2] (a condition 1). For example, the interval [N1, N2] may be an interval [0, 5], or optionally, may be an interval [0,4] or an interval [0, 3]. The modulus value M1 approximates to 0 when the electronic device is static.

If a three-axis acceleration value corresponding to a last frame of signal in the first signal segment B is (x2, y2, z2), and is in a unit of m/s$^2$, the electronic device may calculate a modulus value M2 of the three-axis acceleration value based on (x2, y2, z2), for example, may calculate M2 based on a relational expression $$M2 = \sqrt{\left(\frac{x2}{9.8}\right)^2 + \left(\frac{y2}{9.8}\right)^2 + \left(\frac{z2}{9.8}\right)^2},$$

and then normalize M2, and determine whether normalized M2 falls within an interval [N3, N4] (a condition 2). For example, the interval [N3, N4] may be an interval [0.6, 1.5], or optionally, may be an interval [0.8, 1.2]. The modulus value M2 approximates to 1 when the electronic device is static.

In addition, it may be learned from FIG. 4 that when a code scanning port is in a vertical direction and faces forward, a display of the electronic device usually faces forward, and in this case, an angle at which the display is inclined forward or backward or inclined to the left or to the right is less than 45°. In this case, the electronic device may further determine whether z2 in the three-axis acceleration value falls within an interval [N5, N6] (a condition 3). For example, the interval [N5, N6] may be an interval [−0.707, 0.707]. When a code scanning port is in a horizontal direction and faces upward, a display of the electronic device usually faces downward, and in this case, an angle at which the display is inclined upward or downward or inclined to the left or to the right is less than 45°. In this case, the electronic device may further determine whether z2 in the three-axis acceleration values is less than a first threshold (a condition 3). For example, the first threshold may be −0.707.

It may be learned from the description of the condition 1 to the condition 3 that determining is performed based on a termination state of the electronic device. In addition, the electronic device may further perform analysis by using a process in which the user extends the electronic device to perform code scanning. An action of extending, by the user, the electronic device to perform code scanning is relatively natural, and is usually not performed at a very high or low speed. Therefore, for the first signal segment A (namely, the gyroscope signal data), there is usually a main peak signal (a condition 4), the main peak is usually located in an intermediate region of the first signal segment A (a condition 5), and there is a monotonically increasing trend for signal distribution before the main peak and a monotonically decreasing trend for signal distribution after the main peak, or there is a monotonically decreasing trend for signal distribution before the main peak and a monotonically increasing trend for signal distribution after the main peak (a condition 6).

In conclusion, six determining conditions are provided in this embodiment of this application:
the condition 1 in which it is determined whether M1 falls within the interval [N1, N2];
the condition 2 in which it is determined whether M2 falls within the interval [N3, N4];
the condition 3 in which it is determined whether z2 falls within the interval [N5, N6] or whether z2 is less than the first threshold;
the condition 4 in which there is a main peak signal in the first signal segment A;
the condition 5 in which the main peak is located in the intermediate region of the first signal segment A; and
the condition 6 in which there is a monotonically increasing trend for signal distribution before the main peak and a monotonically decreasing trend for signal distribution after the main peak, or there is a monotonically decreasing trend for signal distribution before the main peak and a monotonically increasing trend for signal distribution after the main peak.

In this case, when "the condition 4 is met", "the condition 5 is met", "the condition 6 is met", "the condition 1 is met", "the condition 2 is met", and "the condition 3 is met", it may be determined that the gesture action of the user corresponding to the first signal segment A and the first signal segment B is a suspected wrist turning action. For example, the electronic device outputs 1 when there is a suspected wrist turning action, and the electronic device outputs 0 when there is no suspected wrist turning action.

Figure 7:
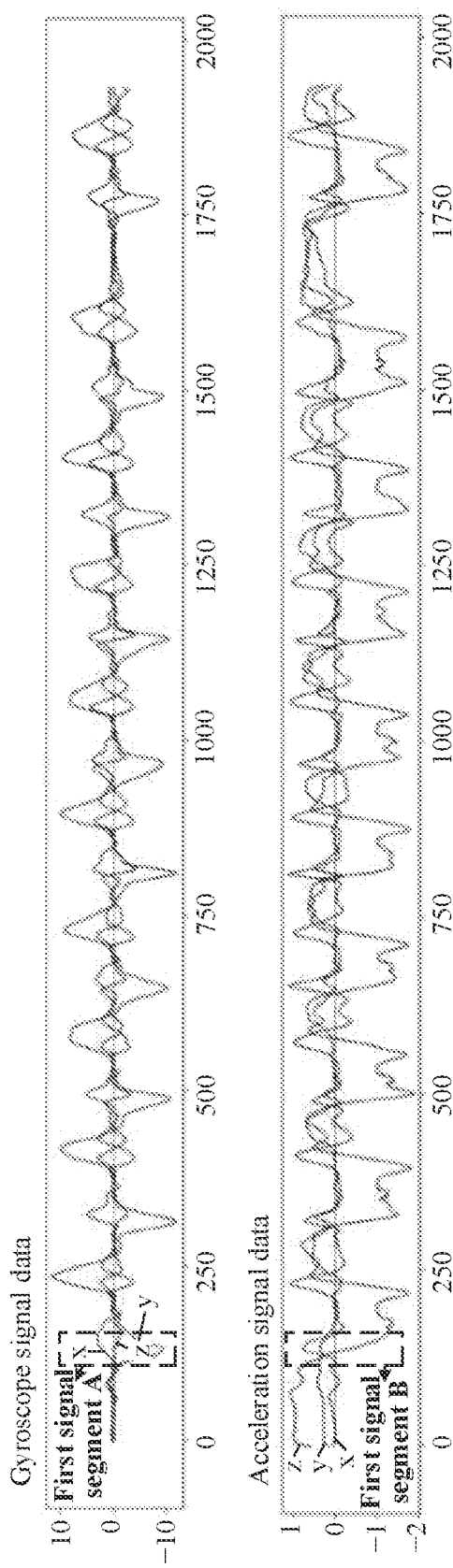
FIG. 7 is a signal diagram of gyroscope signal data and acceleration signal data according to an embodiment of this application.
Figure 8:
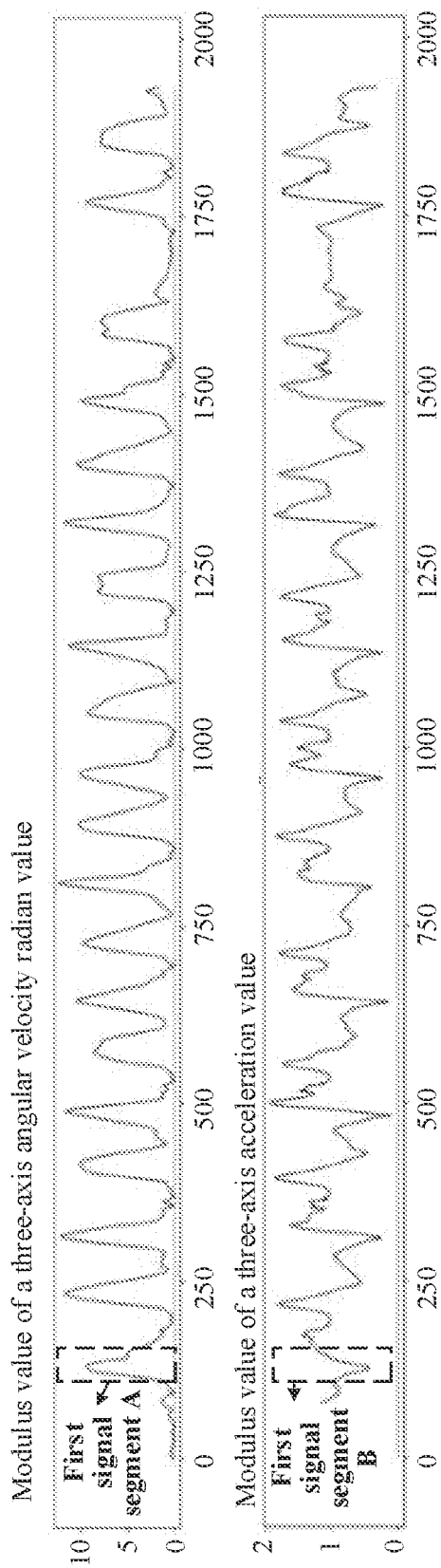
FIG. 8 is a signal diagram of a modulus value of a three-axis angular velocity radian value and a modulus value of a three-axis acceleration value according to an embodiment of this application.

For example, FIG. 8 shows a modulus value of a three-axis angular velocity radian value corresponding to each frame of gyroscope signal and a modulus value of a three-axis acceleration value corresponding to each frame of acceleration signal in FIG. 7. In a schematic diagram of the modulus value of the three-axis angular velocity radian value in FIG. 8, a horizontal axis represents a quantity of signal frames, and a vertical axis represents an amplitude of the modulus value of the three-axis angular velocity radian value corresponding to each frame of signal. In a schematic diagram of the modulus value of the three-axis acceleration value in FIG. 8, a horizontal axis represents a quantity of signal frames, and a vertical axis represents an amplitude of the modulus value of the three-axis acceleration value corresponding to each frame of signal. In the gyroscope signal data and the acceleration signal data shown in FIG. 7, signal data corresponding to rectangular dashed-line boxes may be respectively the first signal segment A and the first signal segment B. For a modulus value of a three-axis angular velocity radian value of the first signal segment A and a modulus value of a three-axis acceleration value of the first signal segment B, refer to data in rectangular dashed-line boxes in FIG. 8. It may be learned from FIG. 7 that a z value of the last frame of signal in the first signal segment B is less than −0.707, there is a main peak signal in the first signal segment A, the main peak signal is located in the intermediate region of the first signal segment A, and there is a monotonically decreasing trend for signal distribution before the main peak and a monotonically increasing trend for signal distribution after the main peak. It may be learned from FIG. 8 that the modulus value of the last frame of signal in the first signal segment A falls within the interval [0, 3], and the modulus value of the last frame of signal in the first signal segment B falls within the interval [0.8, 1.2], in other words, the first signal segment A and the first signal segment B meet the foregoing conditions. Therefore, it is determined that the current gesture action of the user is a suspected wrist turning action.

It should be noted that when determining whether the conditions are met, the electronic device may perform determining in the following sequence: Determining is first performed for the condition 4, then for the condition 5, then for the condition 6, then for the condition 1, then for the condition 2, and then for the condition 3. Alternatively, the electronic device may perform determining in the following sequence: Determining is first performed for the condition 5, then for the condition 4, then for the condition 1, then for the condition 6, then for the condition 2, and then for the condition 3. In other words, a sequence of performing determining for the conditions is not limited. In addition, if it is determined, through sequential determining, that a condition is not met, determining may be no longer performed for a subsequent condition. For example, for the sequence in which determining is first performed for the condition 4, then for the condition 5, then for the condition 6, then for the condition 1, then for the condition 2, and then for the condition 3, if the condition 4 is not met, determining is no longer performed for a condition after the condition 5; or if the condition 4 is met but the condition 5 is not met, determining is no longer performed for a condition after the condition 6, and so on.

In the foregoing analysis and determining process, the electronic device may determine, based on the first signal segment A and the first signal segment B, whether the gesture action of the user is a suspected wrist turning action. If the gesture action is not a suspected wrist turning action, for the gyroscope signal data, the electronic device uses a second frame of signal as a starting point, and selects 100 frames of signals as a second signal segment C; and for the acceleration signal data, the electronic device also uses a second frame of signal as a starting point, and selects 100 frames of signals as a second signal segment D. The electronic device continues to analyze the two second signal segments by using the foregoing analysis process, to determine whether the corresponding gesture action of the user is a suspected wrist turning motion, and so on.

It should be noted that if an $i^{th}$ signal segment in the gyroscope signal data and an $i^{th}$ signal segment (i is a natural number) in the acceleration signal data correspond to a same moment, the first signal segment A and the first signal segment B correspond to a same gesture action of the user.

S103. Determine whether the suspected wrist turning action is a post-extension wrist turning action. If the suspected wrist turning action is a post-extension wrist turning action, S104 is performed.

After determining the suspected wrist turning action, the electronic device may continue to process signal data corresponding to the suspected wrist turning action, to determine whether there is a post-extension wrist turning action.

If the signal data corresponding to the suspected wrist turning action is the first signal segment A and the first signal segment B, the electronic device may separately perform feature extraction on a $j^{th}$ frame of signal in the first signal segment A and a $j^{th}$ frame of signal ($1 \leq j \leq 100$) in the first signal segment B, to obtain a corresponding feature set. An extracted feature may be used to represent posture change information of the electronic device, so that the electronic device further determines whether the user performs a wrist turning action.

For example, when performing feature extraction on the $j^{th}$ frame of signal in the first signal segment A and the $j^{th}$ frame of signal in the first signal segment B, the electronic device may obtain nine types of features shown in Table 1.

TABLE 1

| Sequence number | Feature | Quantity |
|---|---|---|
| 1 | Gyroscope signal data (three-axis angular velocity radian value) | 3 |
| 2 | Acceleration signal data (three-axis acceleration value) | 3 |
| 3 | Modulus value of the three-axis acceleration value | 1 |
| 4 | Modulus value of the three-axis angular velocity radian value | 1 |
| 5 | Acceleration in a direction perpendicular to the ground | 1 |
| 6 | Three-axis linear velocity | 3 |
| 7 | Distribution of gravity on three axes | 3 |
| 8 | Rotation matrix | 9 |
| 9 | Quaternion | 4 |
| | Total | 28 |

For example, j=1. In this case, if a three-axis angular velocity radian value corresponding to a first frame of signal in the first signal segment A is (x3, y3, z3), and a three-axis acceleration value corresponding to a first frame of signal in the first signal segment B is (x4, y4, z4), a modulus value of the three-axis angular velocity radian value is that $M3=\sqrt{x3^2+y3^2+z3^2}$, and a modulus value of the three-axis acceleration value is that $$M4 = \sqrt{\left(\frac{x4}{9.8}\right)^2 + \left(\frac{y4}{9.8}\right)^2 + \left(\frac{z4}{9.8}\right)^2}.$$

In addition, the acceleration sensor has a coordinate system (including an x axis, a y axis, and a z axis), and a direction of the z axis is usually not perpendicular to the ground. Therefore, the electronic device may further determine, based on the three-axis acceleration value (x4, y4, z4), the acceleration in the direction perpendicular to the ground, for example, may determine gravitational acceleration in the direction perpendicular to the ground through mapping by using a relationship between a coordinate system (for example, a posture of a mobile phone or a tablet computer) of the electronic device and a reference coordinate system (terrestrial coordinate system). For the three-axis linear velocity, in this embodiment of this application, a velocity that exists when any point on an object moves in a circle with respect to a fixed axis is referred to as a linear velocity, and the electronic device may determine the three-axis linear velocity based on the three-axis angular velocity radian value (x3, y3, z3), for example, determine the three-axis linear velocity based on a relational expression (x3, y3, z3)×r, where r is a circular radius. For the distribution of the gravity on the three axes, in this embodiment of this application, an Euler angle may be obtained with reference to a six-axis fusion algorithm, and standard gravitational acceleration may be mapped onto the three axes based on the Euler angle, to obtain the distribution of the gravity on the three axes. For the rotation matrix, in this embodiment of this application, a matrix that maintains chirality and that has an effect in which after a vector is multiplied, a direction of a vector is changed, but a magnitude of the vector remains unchanged is referred to as the rotation matrix. In this embodiment of this application, a rotation matrix from the reference coordinate system (terrestrial coordinate system) to the coordinate system of the electronic device is calculated. For the quaternion, each quaternion is a linear combination of l, m, n, and k, in other words, the quaternion may be usually expressed as a+bm+cn+dk, where a, b, c, and d are real numbers, and a geometric meaning of each of m, n, and k may be understood as a rotation. In this embodiment of this application, a rotation from the reference coordinate system (terrestrial coordinate system) to the coordinate system of the electronic device is calculated. An m rotation represents a rotation from a positive direction of the axis to a positive direction of the y axis on a plane on which the z axis intersects the y axis, an n rotation represents a rotation from a positive direction of the x axis to the positive direction of the z axis on a plane on which the x axis intersects the z axis, and a k rotation represents a rotation from the positive direction of the y axis to the positive direction of the x axis on a plane on which the y axis intersects the x axis.

In this case, for the 100 frames of signals, there are a total of 100×28 features. Herein, the 100×28 features are referred to as a feature set. It should be noted that features extracted by the electronic device are not limited to the nine types of features, and there may be features more or fewer than the nine types of features. This is not limited in this embodiment of this application.

After obtaining the feature set, the electronic device may input the obtained feature set to a preset first model for recognition, to determine whether the suspected wrist turning action is a real wrist turning action.

Figure 9:
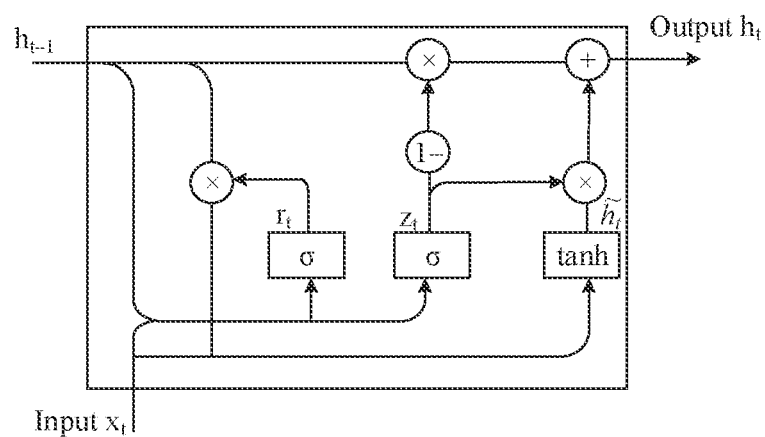
FIG. 9 is a schematic diagram of a structure of a GRU model according to an embodiment of this application.

In an embodiment, the first model may be a network model such as an RNN, an LSTM, or a GRU. The GRU is used as an example. The GRU is a variant of the LSTM network, and has a simpler structure than the LSTM network. Usually, three gate functions, namely, an input gate, a forget gate, and an output gate, are introduced in the LSTM to control an input value, a memory value, and an output value, and there are only two gates, namely, an update data and a reset gate, in the GRU. For a specific structure, refer to FIG. 9. In FIG. 9, zt and rt respectively represent the update gate and the reset gate. The update gate is used to control a degree to which state information at a previous moment is brought into a current state, and a larger value of the update gate indicates a higher degree to which the state information at the previous moment is brought. The reset gate controls an amount of information that is in information of a previous state and that is written into a current candidate set $h_t$, and a smaller value of the reset gate indicates a smaller amount of information that is in the information of the previous state and that is written. After inputting the feature set to the GRU network, the electronic device may obtain a wrist turning action recognition result. In the wrist turning action recognition result, 0 may be used to represent a non-wrist turning action, 1 may be used to represent a post-extension wrist turning action, and 2 may be used to represent a post-withdrawal wrist turning action. Therefore, when the output result is 1, it may be determined that the suspected wrist turning action is a post-extension wrist turning action, and a two-dimensional code needs to be displayed.

It may be understood that before using the first model to perform recognition, the electronic device usually further needs to train the first model, to improve precision of a recognition result obtained by using the first model. Herein, in this embodiment of this application, a positive sample and a negative sample in a process of training the first model are comprehensively considered, and a data set that includes the positive sample and the negative sample is used as training data to train the first model. The positive sample is gyroscope signal data and acceleration signal data collected when the user performs a wrist turning action by holding the electronic device in different initial states and different termination states, and the negative sample is gyroscope signal data and acceleration signal data collected when the user performs a non-wrist turning action by holding the electronic device in different states. For example, the positive sample may be signal data collected when switching is performed from a state in which the user holds the electronic device in a portrait mode to a state in which the user turns the electronic device to the left to enter a landscape mode, and the negative sample may be signal data collected when switching is performed from the state in which the user holds the electronic device in the portrait mode to a state in which the user picks up the electronic device for reading. After collecting the positive sample and the negative sample, the electronic device may use the positive sample and the negative sample as the training data to train the first model.

To conform to a use habit of the user as much as possible, when the positive sample is collected, a target object approaching the electronic device should be in a light color as much as possible and kept on a right side of a body. After the target object is approached, there is a pause for 1-2 seconds, and then state switching is performed. After state switching is performed, there is again a pause for 1-2 seconds, and then a next action is performed. Each group of data in each scenario is collected at least for 10 times, and an optical proximity sensor in the electronic device needs to closely approach the target object. When the negative sample is collected, collection is performed for 15 minutes in each scenario. When data is collected in a same scenario, switching may be performed between a plurality of actions. After each action is performed, there is a pause for 1-2 seconds, and then a next action is performed.

S104. Display a two-dimensional code page.

If it is determined, by performing the foregoing process, that the user currently performs the post-extension wrist turning action, the electronic device may display the corresponding two-dimensional code page. It may be learned from the description in FIG. 5(a) and FIG. 5(b) that the electronic device may correspondingly display a default two-dimensional code, for example, a payment two-dimensional code in Alipay®, and the payment two-dimensional code in Alipay® is displayed in this case. Alternatively, the electronic device may correspondingly display a two-dimensional code that is set by the user and that is frequently used by the user. For example, if a payment two-dimensional code in WeChat® is set, the payment two-dimensional code in WeChat® is displayed in this case.

In an embodiment, any other page may be displayed on the display of the electronic device before the two-dimensional code page is displayed, and when determining that the two-dimensional code page needs to be displayed, the electronic device performs switching from the any other page to the corresponding two-dimensional code page.

In the method for displaying a two-dimensional code, the electronic device recognizes, based on the obtained sensor data, the gesture action performed by the user to perform an operation on the mobile phone, to determine whether a two-dimensional code needs to be displayed, and when determining to display a two-dimensional code, displays the corresponding two-dimensional code page, to reduce operation steps performed by the user to invoke the two-dimensional code, so that a process of presenting the two-dimensional code by the user is simple and efficient.

It may be learned from the description in the foregoing embodiment that the electronic device determines, based on the obtained sensor data, whether the user performs the post-extension wrist turning action, and then displays a two-dimensional code. However, in daily application, the user may extend a wrist in a non-code scanning scenario. Therefore, to improve accuracy of a result of determining, by the electronic device, whether a two-dimensional code needs to be displayed, on the basis the post-extension wrist turning action performed by the user, determining may be further performed with reference to another gesture action (which is referred to as a preset action below) of the user.

Figure 10:
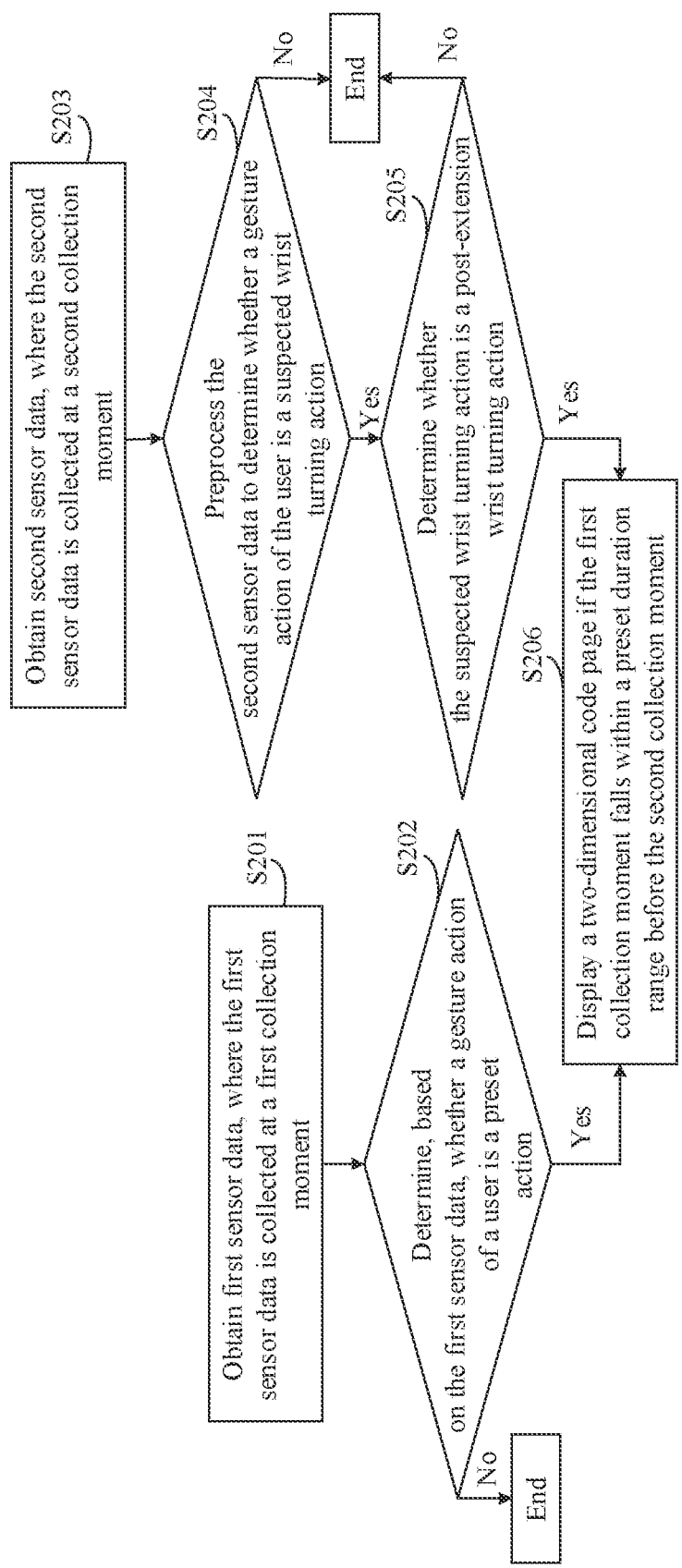
FIG. 10 is another schematic flowchart of a method for displaying a two-dimensional code according to an embodiment of this application.

In an embodiment, the preset action that is of the user and to which reference is made may be a double-tap action or a triple-tap action performed by the user on a back of the electronic device, a shaking action performed by the user by holding the electronic device, or the like. The sensor data of the gyroscope sensor and the sensor data of the acceleration sensor in the electronic device are analyzed, to determine whether the user performs the preset action and the post-extension wrist turning action corresponding to code scanning, and when it is determined that the foregoing gesture actions are performed, the corresponding two-dimensional code is automatically popped up and displayed. A specific process in which an electronic device determines, with reference to a preset action and a post-extension wrist turning action of a user, to display a two-dimensional code page is described below by using an embodiment shown in FIG. 10, and includes the following steps.

S201. Obtain first sensor data, where the first sensor data is collected at a first collection moment.

Optionally, the first sensor data may be data collected by an acceleration sensor, for example, acceleration signal data; may be data collected by an acceleration sensor, for example, acceleration signal data; may be data collected by a pressure sensor, for example, pressure signal data; or may include the foregoing several types of signal data.

S202. Determine, based on the first sensor data, whether a gesture action of the user is a preset action. If the gesture action of the user is the preset action, S206 is performed.

After obtaining the first sensor data, the electronic device may first filter the first sensor data to remove noise in the signal data. Then, the electronic device may analyze the first sensor data to determine whether the gesture action of the user is the preset action. The preset action herein may include a double-tap action or a triple-tap action performed by the user on a back of the electronic device, a shaking action performed by the user by holding the electronic device, or the like.

In an implementable manner, an example in which the first sensor data is acceleration signal data is used, and a process of analyzing the acceleration signal data to determine whether there is the preset action may include: Starting from a first frame of signal in the acceleration signal data, the electronic device may sequentially determine whether there are two consecutive peaks that meet a condition in acceleration signals at approximately 1000 Hz. The condition herein means that a difference between moments corresponding to the two peaks falls within a preset threshold (for example, there are two peaks within 1 second), and peak values and peak widths of the two peaks respectively fall within an interval [N7, N8] and an interval [N9. N10]. For example, for x-axis data of the acceleration signal data, the interval [N7, N8] may be an interval [5, 10], and the interval [N9, N10] may be an interval [50, 100]. If there are two peaks that meet the condition, the electronic device determines that the current gesture action of the user is a double-tap action performed on the back of the electronic device, in other words, is the preset action.

Figure 11:
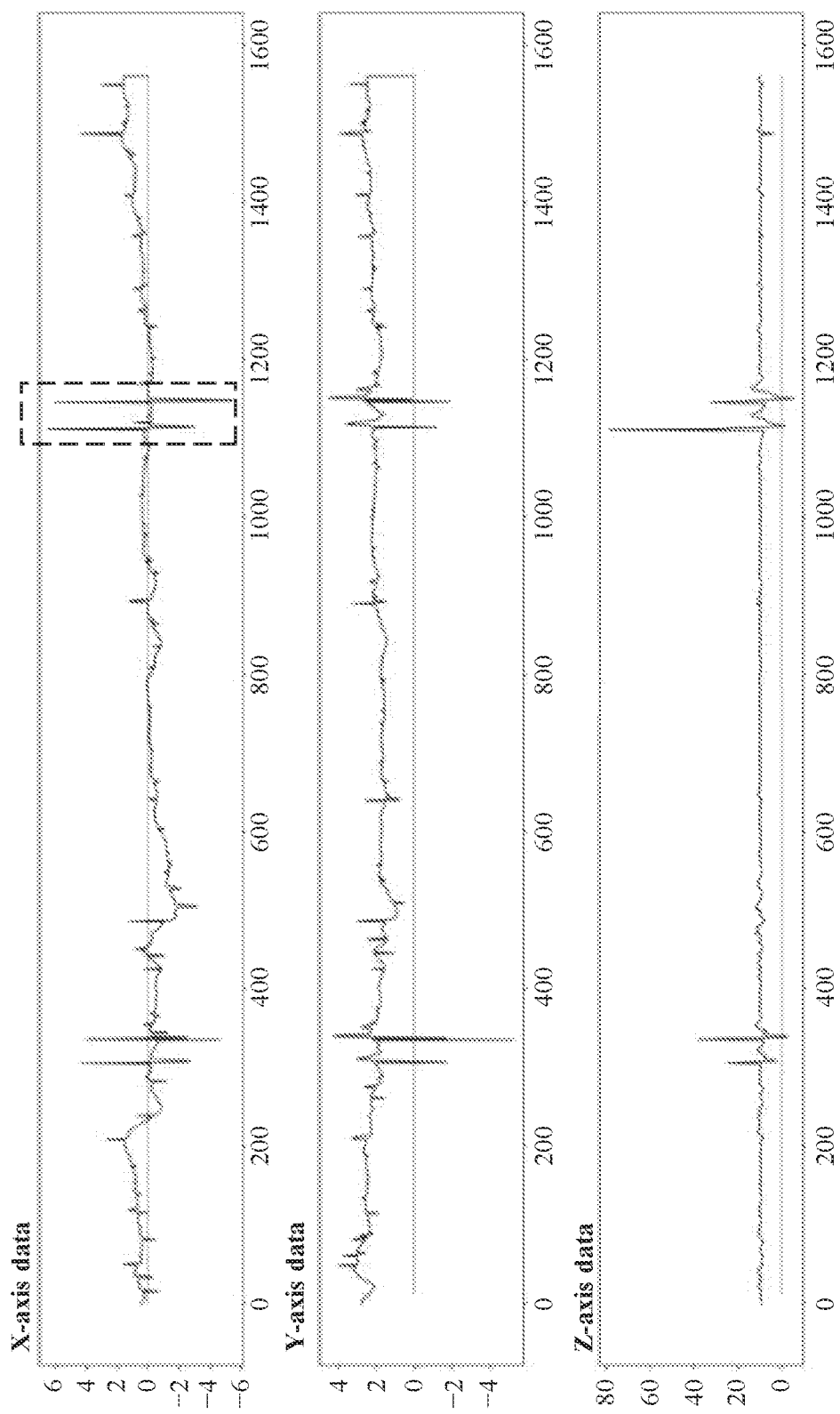
FIG. 11 is a signal distribution diagram of acceleration signal data that exists when a tap action is performed on a back of an electronic device according to an embodiment of this application.

For example, for a signal distribution diagram of acceleration signal data that exists when a tap action is performed on the back of the electronic device, refer to FIG. 11. In a schematic diagram of x-axis data in FIG. 11, a horizontal axis represents a quantity of signal frames, and a vertical axis represents an amplitude of an x-axis acceleration value corresponding to each frame of signal. In a schematic diagram of y-axis data in FIG. 11, a horizontal axis represents a quantity of signal frames, and a vertical axis represents an amplitude of a y-axis acceleration value corresponding to each frame of signal. In a schematic diagram of z-axis data in FIG. 11, a horizontal axis represents a quantity of signal frames, and a vertical axis represents an amplitude of a z-axis acceleration value corresponding to each frame of signal. It may be learned from FIG. 11 that in a rectangular dashed-line box of the x-axis data, there are two consecutive peaks, and peak values and peak widths of the two peaks respectively fall within the interval [5, 10] and the interval [50, 100]. In this case, a gesture action of the user corresponding to this data segment is a double-tap action.

In another implementable manner, a process of analyzing the first sensor data to determine whether there is the preset action may include: The electronic device may input the first sensor data to a second model for recognition, to obtain a preset action recognition result. Optionally, the second model may be a decision tree model, and in the obtained recognition result, 0 may be used to represent a non-gesture action, 1 may be used to represent a double-tap action performed on the back of the electronic device, 2 may be used to represent a triple-tap action performed on the back of the electronic device, and 3 may be used to represent a shaking action performed by holding the electronic device. In this case, if the output result is 1, 2, or 3, the electronic device may determine that the gesture action of the user is the preset action.

It may be understood that before using the second model to perform recognition, the electronic device also needs to train the second model, to improve precision of a recognition result obtained by using the second model. Herein, in this embodiment of this application, a positive sample and a negative sample in a process of training the second model are comprehensively considered, and a data set that includes the positive sample and the negative sample is used as training data to train the second model. The positive sample is acceleration signal data collected when the user performs a tap action and a shaking action for a plurality of times, and the negative sample is acceleration signal data collected when the user performs actions such as walking, running, jumping, putting down the electronic device in daily use, picking up the electronic device, and raising a hand. After collecting the positive sample and the negative sample, the electronic device may use the positive sample and the negative sample as the training data to train the second model.

S203. Obtain second sensor data, where the second sensor data is collected at a second collection moment.

The second sensor data may be data collected by a gyroscope sensor, for example, gyroscope signal data; may be data collected by the acceleration sensor, for example, acceleration signal data; or may include both gyroscope signal data and acceleration signal data.

S204. Preprocess the second sensor data to determine whether a gesture action of the user is a suspected wrist turning action. If the gesture action of the user is a suspected wrist turning action, S205 is performed.

S205. Determine whether the suspected wrist turning action is a post-extension wrist turning action. If the suspected wrist turning action is a post-extension wrist turning action. S206 is performed.

An implementation process of S203 to S205 is similar to that of S101 to S103. Details are not described herein.

S206. Display a two-dimensional code page if the first collection moment falls within a preset duration range before the second collection moment.

The preset duration range may be 3 seconds, in other words, in this embodiment of this application, it is set that the preset action needs to be performed at a moment that falls within 3 seconds before a moment at which the post-extension wrist turning action is performed. If it is determined in S202 that the gesture action corresponding to the first collection moment is the preset action, and it is determined in S205 that the gesture action corresponding to the second collection moment is a post-extension wrist turning action, the electronic device displays a corresponding two-dimensional code interface when the first collection moment falls within a range of 3 seconds before the second collection moment.

It may be understood that the electronic device may display a default two-dimensional code, for example, a payment two-dimensional code in Alipay®. Alternatively, the electronic device may display a two-dimensional code that is set by the user and that is frequently used by the user, for example, a payment two-dimensional code in WeChat®.

It may be further understood that if the gesture action in S202 is not the preset action, the gesture action in S205 is not a post-extension wrist turning action, or the first collection moment does not fall within the preset duration range before the second collection moment, the electronic device does not display the two-dimensional code interface.

In the method for displaying a two-dimensional code, the electronic device recognizes, based on the obtained sensor data, the gesture action performed by the user to perform an operation, to determine whether a two-dimensional code needs to be displayed, and when determining to display a two-dimensional code, displays the corresponding two-dimensional code page, to reduce operation steps performed by the user to invoke the two-dimensional code, so that a process of presenting the two-dimensional code by the user is simple and efficient. In addition, the electronic device determines, with reference to both the preset action and the wrist turning action of the user, to display the corresponding two-dimensional code, and therefore accuracy of a result of determining, by the electronic device, whether to display the two-dimensional code can be improved.

Figure 12:
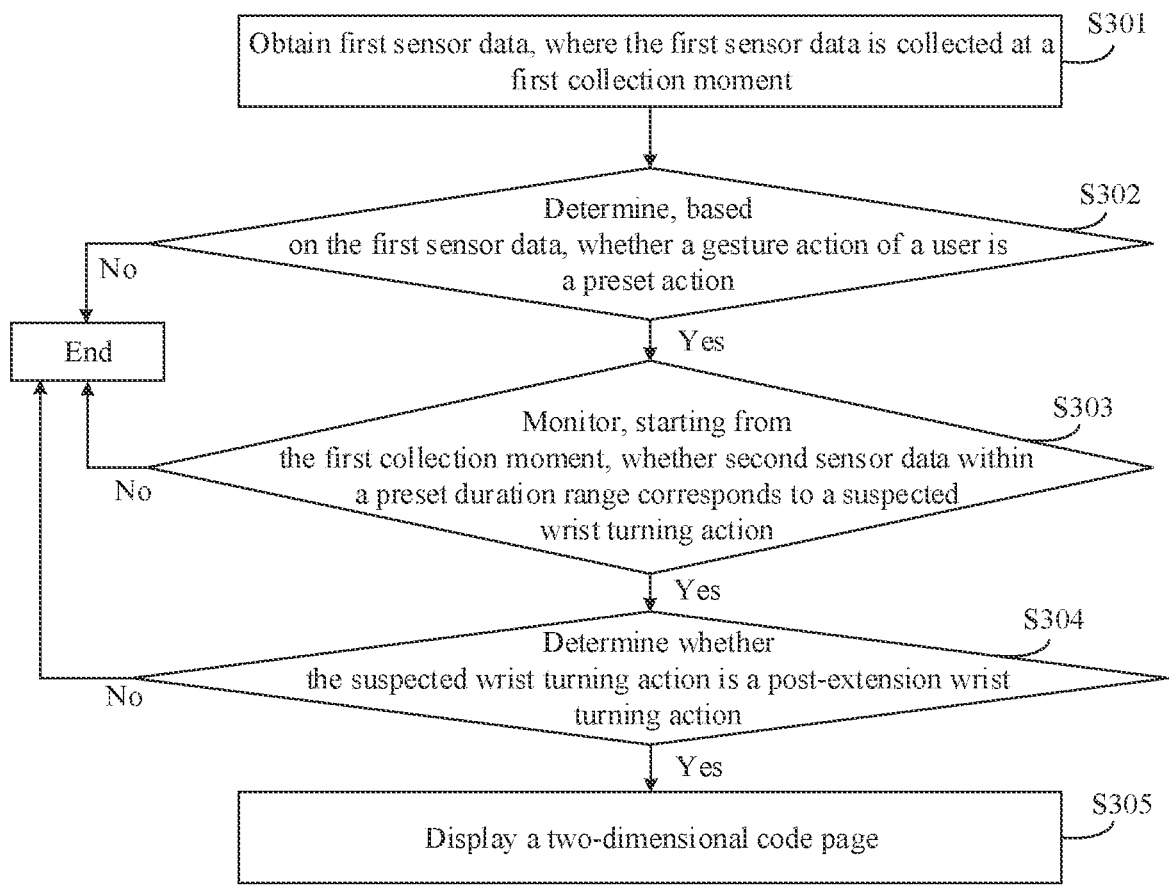
FIG. 12 is still another schematic flowchart of a method for displaying a two-dimensional code according to an embodiment of this application.

Another specific process in which an electronic device determines, with reference to a preset action and a post-extension wrist turning action of a user, to display a two-dimensional code page is described below by using an embodiment shown in FIG. 12, and includes the following steps.

S301. Obtain first sensor data, where the first sensor data is collected at a first collection moment.

The first sensor data may be data collected by at least one of a gyroscope sensor, an acceleration sensor, or a pressure sensor, for example, at least one of acceleration signal data, gyroscope signal data, or pressure signal data.

S302. Determine, based on the first sensor data, whether a gesture action of the user is a preset action. If the gesture action of the user is the preset action, S303 is performed.

For an implementation process of this step, refer to the description in S202. Details are not described herein.

S303. Monitor, starting from the first collection moment, whether second sensor data within a preset duration range corresponds to a suspected wrist turning action. If the second sensor data corresponds to a suspected wrist turning action, S304 is performed.

The second sensor data may include gyroscope signal data and acceleration signal data.

S304. Determine whether the suspected wrist turning action is a post-extension wrist turning action. If the suspected wrist turning action is a post-extension wrist turning action, S305 is performed.

The preset duration range may be 3 seconds, in other words, after the user performs the preset action on the electronic device, the electronic device starts to monitor whether there is a post-extension wrist turning action within 3 seconds, for example, may perform monitoring by starting a monitoring thread. For a process of determining whether there is a suspected wrist turning action and whether the suspected wrist turning action is a post-extension wrist turning action in S303 and S304, refer to the process in S102 and S103. Details are not described herein.

S305. Display a two-dimensional code page.

In this step, the electronic device may display the two-dimensional code page when determining that the suspected wrist turning action is a post-extension wrist turning action. For example, the electronic device may display a default two-dimensional code, for example, a payment two-dimensional code in Alipay®. Alternatively, the electronic device may display a two-dimensional code that is set by the user and that is frequently used by the user, for example, a payment two-dimensional code in WeChat®.

In an implementable manner, when the preset action determined by the electronic device is any one of a double-tap action or a triple-tap action performed by the user on a back of the electronic device or a shaking action performed by the user by holding the electronic device, a monitoring operation may be started. In addition, when the post-extension wrist turning action is detected, the two-dimensional code page is displayed. The displayed two-dimensional code herein may be the default two-dimensional code, for example, the payment two-dimensional code in Alipay®. Alternatively, the two-dimensional code that is set by the user and that is frequently used by the user may be displayed, for example, the payment two-dimensional code in WeChat®.

Figure 13A:
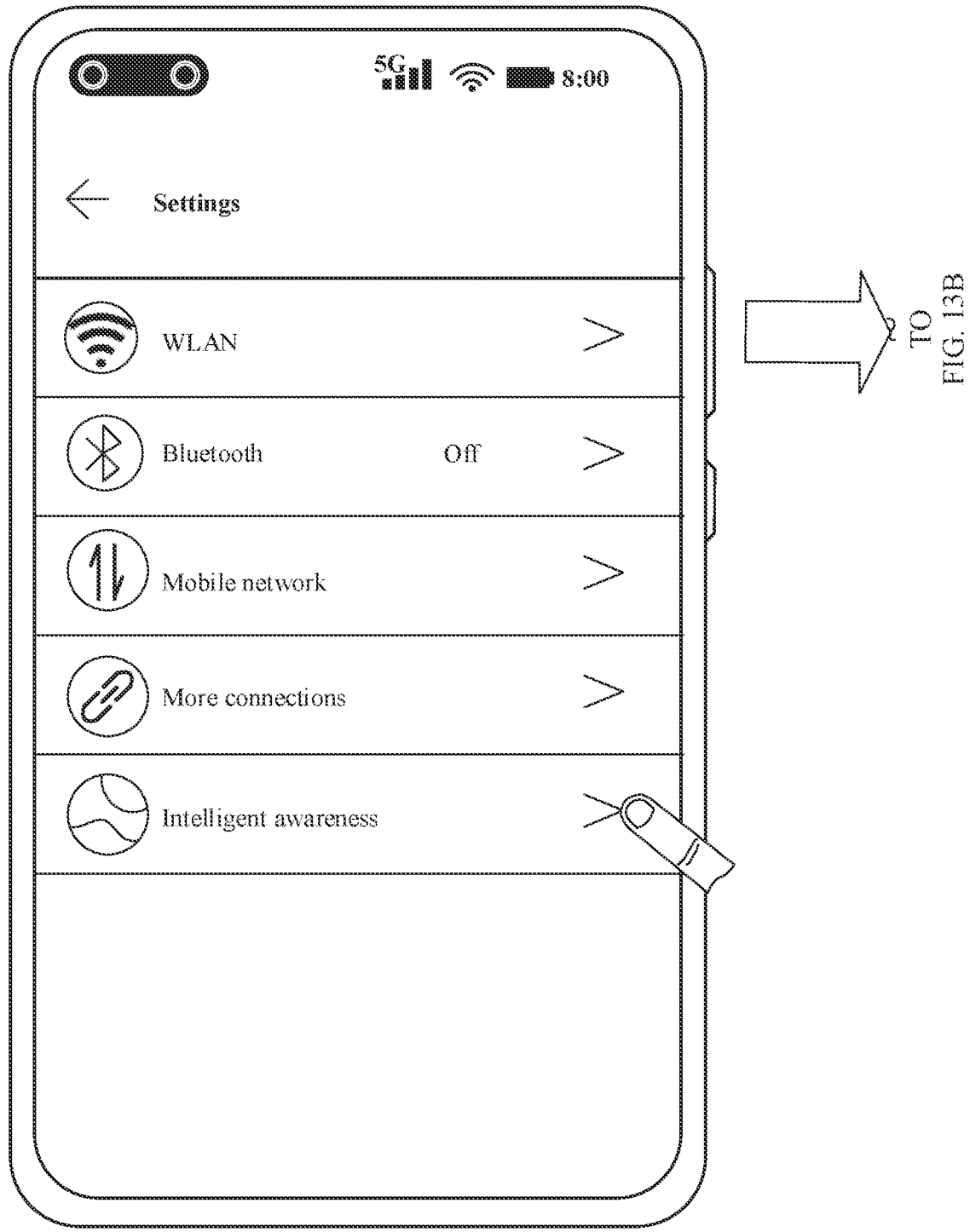
FIG. 13A.
Figure 13B:
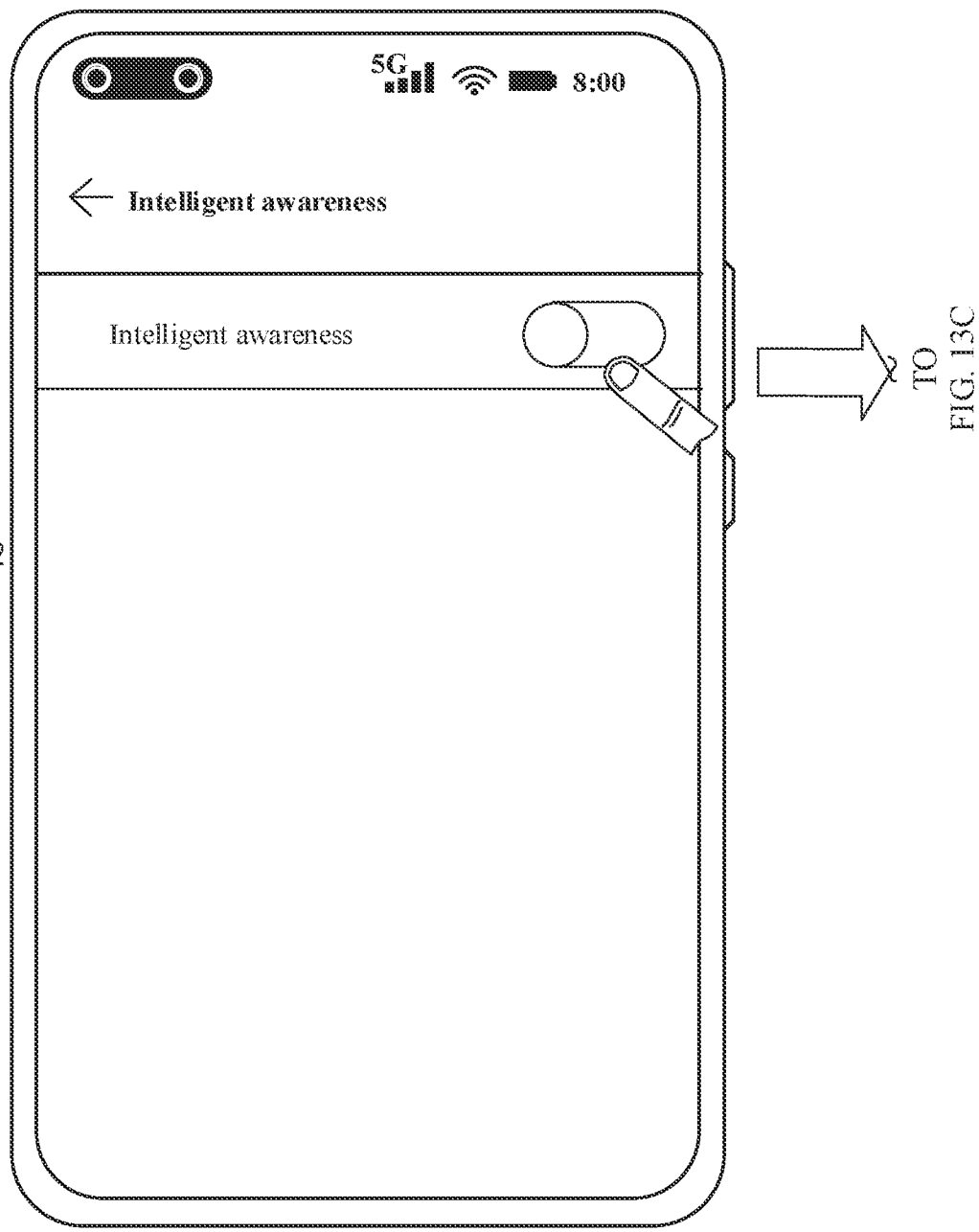
FIG. 13B, and FIG. 13C are still another schematic diagram of an operation interface for enabling an intelligent awareness function according to an embodiment of this application.
Figure 13C:
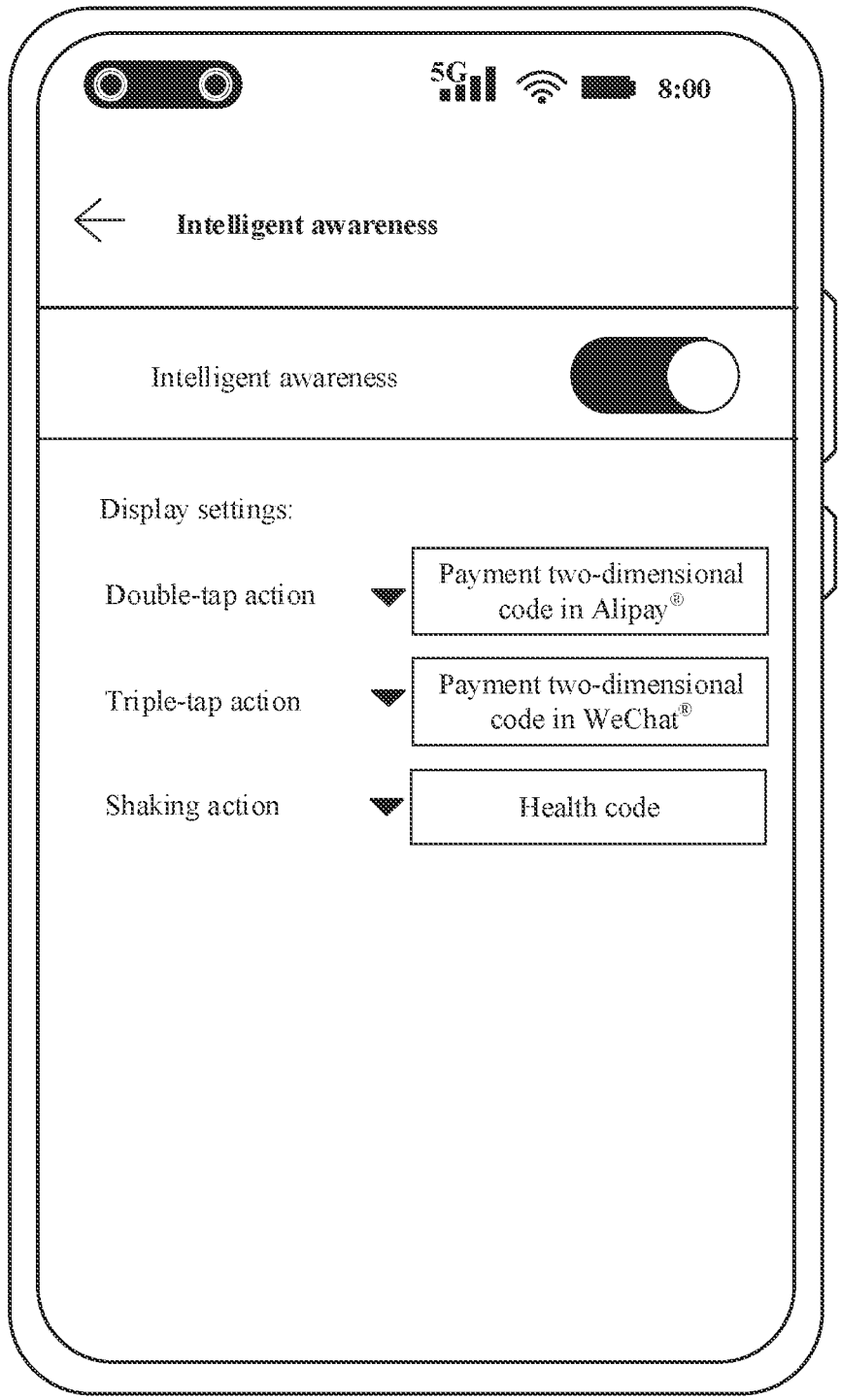

In another implementable manner, there are currently many types of two-dimensional codes, and therefore to enable the electronic device to accurately display a corresponding two-dimensional code based on different requirements or scenarios, as shown in FIG. 13A, FIG. 13B, and FIG. 13C, when the user turns on a switch of an intelligent awareness function, two-dimensional codes corresponding to different gesture actions may be set. For example, it is set that the double-tap action performed on the back of the electronic device corresponds to the payment two-dimensional code in Alipay®, the triple-tap action performed on the back of the electronic device corresponds to the payment two-dimensional code in WeChat®, and the shaking action performed by holding the electronic device corresponds to a health code. The user may tap a triangular icon " " after a corresponding action on a page in FIG. 13A, FIG. 13B, and FIG. 13C, and selects a corresponding two-dimensional code from a two-dimensional code list (not shown in the figure) that is popped up.

In this case, in this implementation, when the preset action determined by the electronic device is a double-tap action performed by the user on the back of the electronic device, and the post-extension wrist turning action is detected, the payment two-dimensional code in Alipay® may be displayed; when the preset action determined by the electronic device is a triple-tap action performed by the user on the back of the electronic device, and the post-extension wrist turning action is detected, the payment two-dimensional code in WeChat® may be displayed; or when the preset action determined by the electronic device is a shaking action performed by the user on the electronic device, and the post-extension wrist turning action is detected, the health code may be displayed.

It may be understood that if the electronic device does not detect the post-extension wrist turning action within the preset duration range starting from the first collection moment, no two-dimensional code interface is displayed.

In an embodiment, after displaying the two-dimensional code page, the electronic device may further continue to monitor whether there is a post-withdrawal wrist turning action, and when there is a post-withdrawal wrist turning action, close the two-dimensional code page, and display any other page displayed before the two-dimensional code page is displayed. It should be noted that if the electronic device currently displays a payment two-dimensional code, the two-dimensional code page needs to be closed after the user enters a password and a payment is successfully made. Alternatively, when one-step payment is set for some payment applications, the two-dimensional code page may be directly closed. For a process of determining whether there is a post-withdrawal wrist turning action, refer to the process in S102 and S103. For example, when the wrist turning action recognition result obtained by the electronic device in S103 is 2 (namely, a post-withdrawal wrist turning action), it may be determined that there is a post-withdrawal wrist turning action.

In the method for displaying a two-dimensional code, when recognizing, based on the obtained sensor data, that the user performs the preset action, the electronic device monitors whether there is a post-extension wrist turning action within the preset duration range, and when there is a post-extension wrist turning action, determines to display a two-dimensional code, to reduce operation steps performed by the user to invoke the two-dimensional code, so that a process of presenting the two-dimensional code by the user is simple and efficient. In addition, the electronic device determines, with reference to both the preset action and the wrist turning action of the user, to display the corresponding two-dimensional code, and therefore accuracy of a result of determining, by the electronic device, whether to display the two-dimensional code can be improved.

Figure 14A:
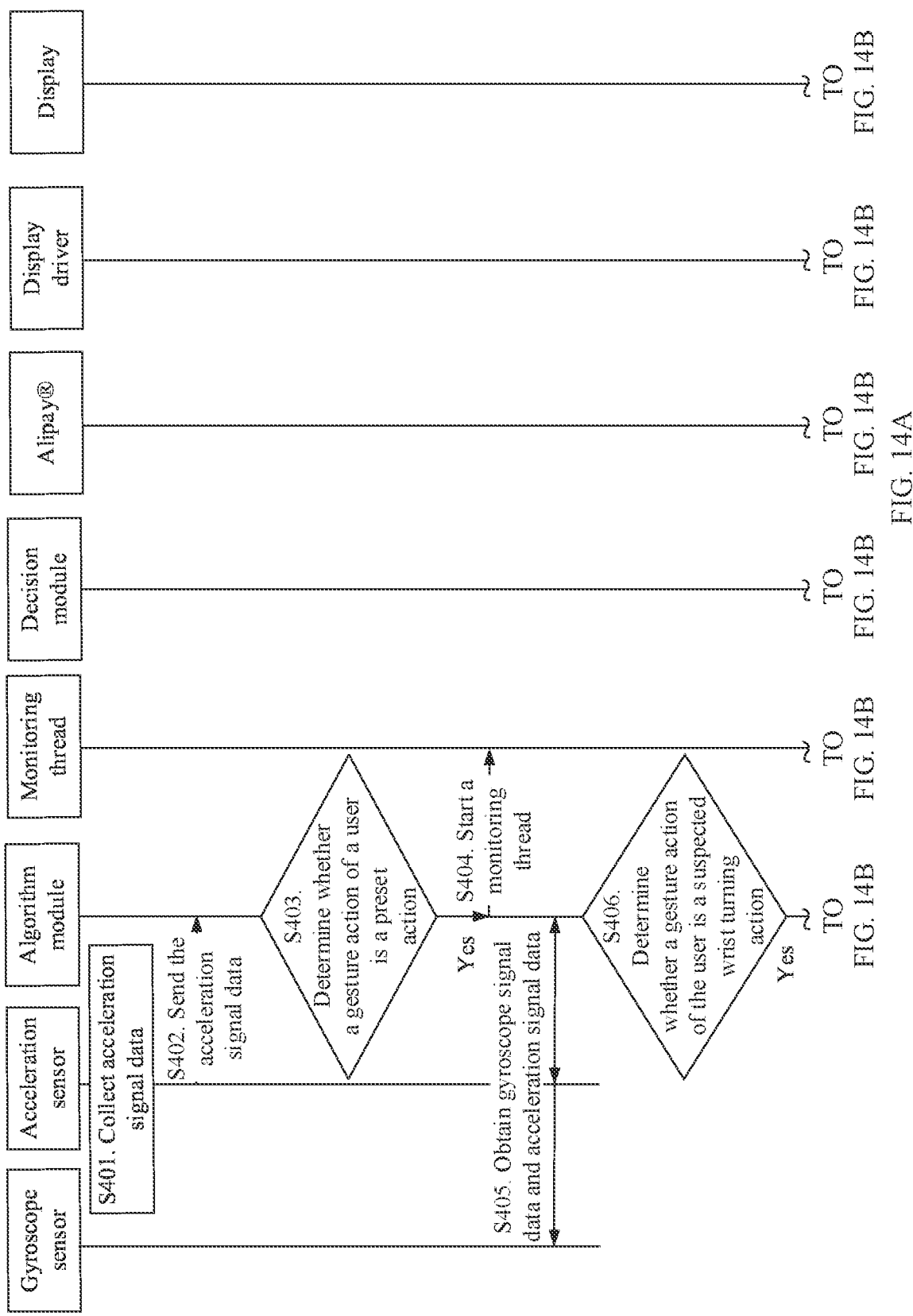
FIG. 14A and FIG. 14B are still another schematic flowchart of a method for displaying a two-dimensional code according to an embodiment of this application.
Figure 14B:
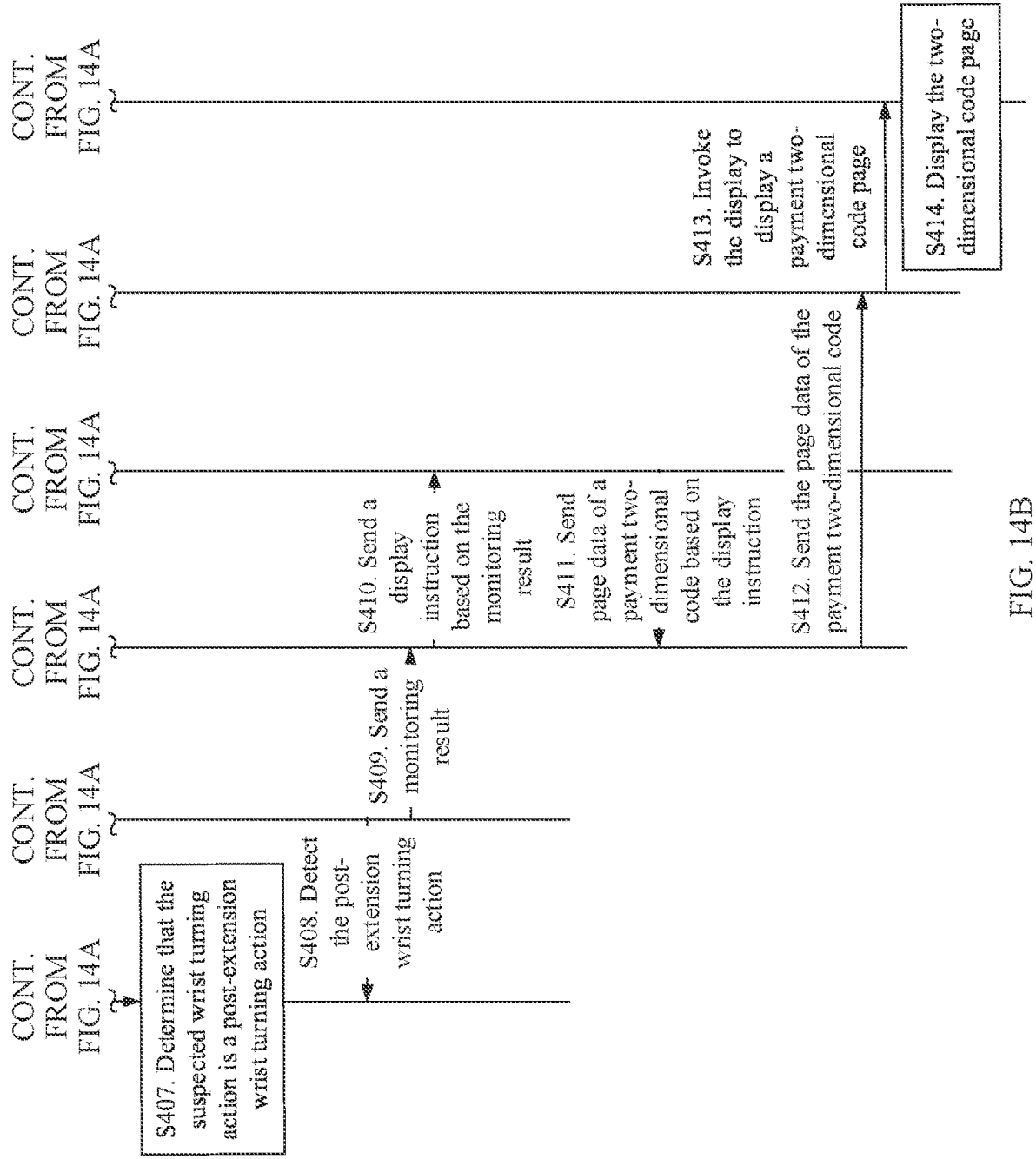

A process in an embodiment shown in FIG. 14A and FIG. 14B is described with reference to the software structure of the electronic device shown in FIG. 3. FIG. 14A and FIG. 14B are a time sequence interaction diagram of a method for displaying a two-dimensional code according to an embodiment of this application. An example in which first sensor data is acceleration signal data, and second sensor data is gyroscope signal data and acceleration signal data is used. The method includes the following steps.

S401. An acceleration sensor collects acceleration signal data, where the acceleration signal data is collected at a first collection moment.

S402. The acceleration sensor sends the acceleration signal data to an algorithm module.

S403. The algorithm module invokes SensorAlg to process the acceleration signal data, to determine whether a gesture action of a user is a preset action, and performs S404 if the gesture action of the user is the preset action.

S404. The algorithm module starts a monitoring thread to monitor whether there is a post-extension wrist turning action within a preset duration range starting from the first collection moment.

S405. The algorithm module obtains gyroscope signal data from a gyroscope sensor, and obtains acceleration signal data from the acceleration sensor.

S406. The algorithm module preprocesses the gyroscope signal data and the acceleration signal data to determine whether a gesture action of the user is a suspected wrist turning action, and performs S407 if the gesture action of the user is a suspected wrist turning action.

S407. The algorithm module determines that the suspected wrist turning action is a post-extension wrist turning action.

S408. The monitoring thread detects the post-extension wrist turning action.

S409. The monitoring thread sends a monitoring result to a decision module.

S410. The decision module sends a display instruction to a corresponding application (in FIG. 14A and FIG. 14B, description is provided by using an example in which the application is Alipay®) based on the monitoring result.

It may be understood that the monitoring result may include an identifier of the corresponding application, so that the decision module can accurately send the display instruction to the corresponding application.

S411. Alipay® sends page data of a payment two-dimensional code to the decision module based on the received display instruction.

S412. The decision module sends the page data of the payment two-dimensional code to a display driver, and indicates the display driver to invoke a display to display a payment two-dimensional code page.

S413. The display driver invokes the display to display the payment two-dimensional code page.

S414. The display displays the payment two-dimensional code page.

An example of the method for displaying a two-dimensional code provided in the embodiments of this application is described above in detail. It may be understood that to implement the foregoing functions, the electronic device includes corresponding hardware and/or corresponding software modules for performing the functions. It should be readily appreciated by a person skilled in the art that the example units, algorithms, and steps described with reference to the embodiments disclosed in this specification can be implemented in this application by using hardware or a combination of hardware and computer software. Whether a function is performed by hardware or by driving hardware by using computer software depends on particular applications and design constraints of the technical solutions. With reference to the embodiments, a person skilled in the art may use different methods to implement the described functions for each specific application, but it should not be considered that the implementation goes beyond the scope of this application.

In the embodiments of this application, the electronic device may be divided into functional modules based on the foregoing method example. For example, each functional module may be obtained through division based on each corresponding function, for example, a detection unit, a processing unit, or a display unit, or two or more functions may be integrated into one module. The integrated module may be implemented in a form of hardware, or may be implemented in a form of a software functional module. It should be noted that in the embodiments of this application, the module division is an example, and is merely logical function division. In actual implementation, there may be another division manner.

It should be noted that for all related content of the steps in the foregoing method embodiments, refer to the functional description of the corresponding functional module. Details are not described herein.

The electronic device provided in the embodiments is configured to perform the method for displaying a two-dimensional code. Therefore, effects that are the same as those of the method can be achieved.

When an integrated unit is used, the electronic device may further include a processing module, a storage module, and a communications module. The processing module may be configured to control and manage an action of the electronic device. The storage module may be configured to support the electronic device in executing stored program code, data, and the like. The communications module may be configured to support the electronic device in communicating with another device.

The processing module may be a processor or a controller. The processing module may implement or perform various example logic blocks, modules, and circuits described with reference to the content disclosed in this application. The processor may alternatively be a combination that implements a computing function, for example, a combination of one or more microprocessors or a combination of a digital signal processor (digital signal processing, DSP) and a microprocessor. The storage module may be a memory. The communications module may be specifically a device, for example, a radio frequency circuit, a Bluetooth chip, or a Wi-Fi chip, that interacts with another electronic device.

In an embodiment, when the processing module is a processor and the storage module is a memory, the electronic device in the embodiments may be a device having the structure shown in FIG. 2.

An embodiment of this application further provides a computer-readable storage medium. The computer-readable storage medium stores a computer program. When the computer program is executed by a processor, the processor is enabled to perform the method for displaying a two-dimensional code in any one of the foregoing embodiments.

An embodiment of this application further provides a computer program product. When the computer program product is run on a computer, the computer is enabled to perform the related steps, to implement the method for displaying a two-dimensional code in the foregoing embodiments.

In addition, an embodiment of this application further provides an apparatus. The apparatus may be specifically a chip, a component, or a module. The apparatus may include a processor and a memory connected to each other. The memory is configured to store computer-executable instructions. When the apparatus runs, the processor may execute the computer-executable instructions stored in the memory, so that the chip performs the method for displaying a two-dimensional code in the foregoing method embodiments.

The electronic device, the computer-readable storage medium, the computer program product, or the chip provided in the embodiments is configured to perform the corresponding method provided above. Therefore, for beneficial effects that can be achieved by the electronic device, the computer-readable storage medium, the computer program product, or the chip, refer to the beneficial effects in the corresponding method provided above. Details are not described herein.

In the description of the foregoing implementations, a person skilled in the art may understand that for convenient and brief description, division into the foregoing functional modules is merely used as an example for description. In actual application, the foregoing functions may be allocated to different functional modules and implemented based on a requirement, in other words, an inner structure of an apparatus is divided into different functional modules to complete all or some of the functions described above.

In the several embodiments provided in this application, it should be understood that the disclosed apparatus and method may be implemented in another manner. For example, the described apparatus embodiments are merely examples. For example, the module or unit division is merely logical function division. In actual implementation, there may be another division manner. For example, a plurality of units or components may be combined or integrated into another apparatus, or some features may be ignored or not performed. In addition, the displayed or discussed mutual couplings, direct couplings, or communication connections may be implemented by using some interfaces. The indirect couplings or communication connections between the apparatuses or units may be implemented in electronic, mechanical, or other forms.

The units described as separate components may or may not be physically separate, and the components displayed as units may be one physical unit or a plurality of physical units, in other words, may be located at one position, or may be distributed at a plurality of positions. Some or all of the units may be selected based on an actual requirement, to achieve the objectives of the solutions in the embodiments.

In addition, the functional units in the embodiments of this application may be integrated into one processing unit, each unit may exist alone physically, or two or more units may be integrated into one unit. The integrated unit may be implemented in a form of hardware, or may be implemented in a form of a software functional unit.

If the integrated unit is implemented in the form of a software functional unit and sold or used as an independent product, the integrated unit may be stored in a readable storage medium. Based on such an understanding, the technical solutions in the embodiments of this application essentially, a part contributing to the conventional technology, or some or all of the technical solutions may be embodied in a form of a software product. The software product is stored in a storage medium that includes several instructions used to enable a device (which may be a microcontroller, a chip, or the like) or a processor (processor) to perform all or some of the steps in the method in the embodiments of this application. The storage medium includes various media that can store program code, for example, a USB flash drive, a removable hard disk, a read-only memory (read-only memory, ROM), a random access memory (random access memory, RAM), a magnetic disk, or an optical disk.

The foregoing content is merely specific implementations of this application, but the protection scope of this application is not limited thereto. Any variation or replacement readily figured out by a person skilled in and familiar with the art within the technical scope disclosed in this application shall fall within the protection scope of this application. Therefore, the protection scope of this application shall be subject to the protection scope of the claims.

What is claimed is:

1. A method for displaying a two-dimensional code, wherein the method is performed by an electronic device, the method comprising:
    obtaining, by one or more processors of the electronic device, first sensor data, wherein the first sensor data is collected at a first moment;
    determining, by the one or more processors and based on the first sensor data, whether a first action of a user corresponding to the first moment is a preset action;
    obtaining, by the one or more processors, second sensor data;
    preprocessing the second sensor data by filtering the second sensor data to determine whether a second action is a suspected wrist turning action, wherein the suspected wrist turning action is a wrist turning action responsive to a probability being greater than or equal to a preset probability threshold;
    responsive to the first action being the preset action, determining, by the one or more processors and based on the second sensor data, whether the user performs a wrist turning action within a preset duration range starting from the first moment, wherein the wrist turning action comprises a post-extension wrist turning action;
    responsive to determining that the wrist turning action is performed within the preset duration range, displaying, on a display of the electronic device, a preset two-dimensional code page;
    obtaining, by the one or more processors, third sensor data;
    processing, by the one or more processors, the third sensor data to obtain a third recognition result; and
    displaying, on the display, a first page when the third recognition result represents that a third action of the user corresponding to the third sensor data is a post-withdrawal wrist turning action, wherein the first page is a page displayed before the electronic device displays the two-dimensional code page.

2. The method of claim 1, wherein the second sensor data is collected at a second moment, and the second moment falls within the preset duration range after the first moment, wherein the method further comprises determining, based on the second sensor data, whether the second action of the user corresponding to the second moment is a wrist turning action.

3. The method of claim 2, wherein determining, based on the second sensor data, whether the second action of the user corresponding to the second moment is a wrist turning action comprises:
    determining, when the second action is a suspected wrist turning action, whether the second action is a wrist turning action.

4. The method of claim 3, wherein the second sensor data comprises gyroscope signal data and acceleration signal data, and wherein preprocessing the second sensor data to determine whether the second action is a suspected wrist turning action comprises:
    obtaining first sub-data from the gyroscope signal data, wherein the first sub-data is a preset quantity of consecutive frames of data in the gyroscope signal data;
    obtaining second sub-data from the acceleration signal data, wherein the second sub-data is a preset quantity of consecutive frames of signals in the acceleration signal data, and wherein a location of the first sub-data in the gyroscope signal data is the same as a location of the second sub-data in the acceleration signal data; and determining, if the first sub-data and the second sub-data meet a first preset condition, that the second action is a suspected wrist turning action.

5. The method of claim 4, wherein the first preset condition comprises at least one of the following conditions:
   a condition 1 in which an angular velocity modulus value corresponding to a last frame of signal in the first sub-data falls within a first interval;
   a condition 2 in which an acceleration modulus value corresponding to a last frame of signal in the second sub-data falls within a second interval;
   a condition 3 in which a z-axis acceleration value corresponding to the last frame of signal in the second sub-data falls within a third interval or is less than a first threshold;
   a condition 4 in which there is a main peak signal in the first sub-data;
   a condition 5 in which the main peak signal is located in an intermediate region of the first sub-data; or
   a condition 6 in which either a) there is a monotonically increasing trend for signal distribution before the main peak signal and a monotonically decreasing trend for signal distribution after the main peak signal, or b) there is a monotonically decreasing trend for signal distribution before the main peak signal and a monotonically increasing trend for signal distribution after the main peak signal.

6. The method of claim 4, wherein determining whether the second action is a wrist turning action comprises:
   recognizing the first sub-data and the second sub-data by using a preset first model, to obtain a first recognition result, wherein the first model is any one of a recurrent neural network (RNN) model, a long short-term memory (LSTM) model, and a gated recurrent unit (GRU) model; and
   determining, when the first recognition result is a first preset result, that the second action is a wrist turning action.

7. The method of claim 1, wherein determining, based on the first sensor data, that the first action of the user corresponding to the first moment is a preset action comprises:
   recognizing the first sensor data by using a preset second model, to obtain a second recognition result; and
   determining, when the second recognition result is a second preset result, that the first action is the preset action, wherein the second model is a decision tree model.

8. The method of claim 1, wherein the preset action comprises a double-tap action or a triple-tap action performed by the user on a back of the electronic device, or a shaking action performed by the user by holding the electronic device.

9. The method of claim 8, wherein displaying the preset two- dimensional code page comprises:
   a) displaying a first two-dimensional code page if the first action is a double-tap action performed by the user on the back of the electronic device;
   b) displaying a second two-dimensional code page if the first action is a triple-tap action performed by the user on the back of the electronic device; or
   c) displaying a third two-dimensional code page if the first action is a shaking action performed by the user by holding the electronic device.

10. The method of claim 1, wherein the post-extension wrist turning action comprises a portrait-mode wrist turning action, a landscape-mode wrist turning action, a wrist turning action performed through inversion, a wrist turning action performed at a specific inclination angle, or an inward wrist turning action performed by raising a hand.

11. The method of claim 1, wherein the first sensor data is data collected by at least one of a gyroscope sensor, an acceleration sensor, or a pressure sensor.

12. An electronic device, comprising:
    a display;
    one or more processors coupled to the display; and
    a memory coupled to the one or more processors, wherein the memory stores instructions that, when executed by the one or more processors, cause the electronic device to be configured to:
      obtain, by the one or more processors, first sensor data, wherein the first sensor data is collected at a first moment;
      determine, by the one or more processors and based on the first sensor data, whether a first action of a user corresponding to the first moment is a preset action;
      obtain, by the one or more processors, second sensor data;
      preprocess the second sensor data by filtering the second sensor data to determine whether a second action is a suspected wrist turning action, wherein the suspected wrist turning action is a wrist turning action responsive to a probability being greater than or equal to a preset probability threshold;
      responsive to the first action being the preset action, determine, by the one or more processors and based on the second sensor data, whether the user performs a wrist turning action within a preset duration range starting from the first moment, wherein the wrist turning action comprises a post-extension wrist turning action;
      responsive to determining that the wrist turning action is performed within the preset duration range, display, on the display, a preset two-dimensional code page;
      obtain, by the one or more processors, third sensor data;
      process, by the one or more processors, the third sensor data to obtain a third recognition result; and
      display, on the display, a first page when the third recognition result represents that a third action of the user corresponding to the third sensor data is a post-withdrawal wrist turning action, wherein the first page is a page displayed before the electronic device displays the two-dimensional code page.

13. The electronic device of claim 12, wherein the second sensor data is collected at a second moment, and the second moment falls within the preset duration range after the first moment, wherein the electronic device is further configured to determine, based on the second sensor data, whether the second action of the user corresponding to the second moment is a wrist turning action.

14. The electronic device of claim 13, wherein when the electronic device determines, based on the second sensor data, whether the second action of the user corresponding to the second moment is a wrist turning action, the electronic device is further configured to:
    determine, when the second action is a suspected wrist turning action, whether the second action is a wrist turning action.

15. The electronic device of claim 14, wherein the second sensor data comprises gyroscope signal data and acceleration signal data, and wherein when the electronic device preprocesses the second sensor data to determine whether the second action is a suspected wrist turning action, the electronic device is further configured to:

obtain first sub-data from the gyroscope signal data, wherein the first sub-data is a preset quantity of consecutive frames of data in the gyroscope signal data;

obtain second sub-data from the acceleration signal data, wherein the second sub-data is a preset quantity of consecutive frames of signals in the acceleration signal data, and wherein a location of the first sub-data in the gyroscope signal data is the same as a location of the second sub-data in the acceleration signal data; and determine, if the first sub-data and the second sub-data meet a first preset condition, that the second action is a suspected wrist turning action.

16. The electronic device of claim 15, wherein the first preset condition comprises at least one of the following conditions:

a condition 1 in which an angular velocity modulus value corresponding to a last frame of signal in the first sub-data falls within a first interval;

a condition 2 in which an acceleration modulus value corresponding to a last frame of signal in the second sub-data falls within a second interval;

a condition 3 in which a z-axis acceleration value corresponding to the last frame of signal in the second sub-data falls within a third interval or is less than a first threshold;

a condition 4 in which there is a main peak signal in the first sub-data;

a condition 5 in which the main peak signal is located in an intermediate region of the first sub-data; or a condition 6 in which either a) there is a monotonically increasing trend for signal distribution before the main peak signal and a monotonically decreasing trend for signal distribution after the main peak signal, or b) there is a monotonically decreasing trend for signal distribution before the main peak signal and a monotonically increasing trend for signal distribution after the main peak signal.

17. The electronic device of claim 12, wherein when the electronic device determines, based on the first sensor data, that a first action of a user corresponding to the first moment is a preset action, the electronic device is further configured to:

recognize the first sensor data by using a preset second model, to obtain a second recognition result; and determine, when the second recognition result is a second preset result, that the first action is the preset action, wherein the second model is a decision tree model.

18. The electronic device of claim 12, wherein the preset action comprises a double-tap action or a triple-tap action performed by the user on a back of the electronic device, or a shaking action performed by the user by holding the electronic device.

19. The electronic device of claim 12, wherein the post-extension wrist turning action comprises a portrait-mode wrist turning action, a landscape-mode wrist turning action, a wrist turning action performed through inversion, a wrist turning action performed at a specific inclination angle, or an inward wrist turning action performed by raising a hand.

20. A non-transitory computer-readable storage medium, wherein the computer-readable storage medium stores a computer program that, when executed by one or more processors of an electronic device, causes the electronic device to be configured to:

obtain, by the one or more processors, first sensor data, wherein the first sensor data is collected at a first moment;

determine, by the one or more processors and based on the first sensor data, whether a first action of a user corresponding to the first moment is a preset action;

obtain, by the one or more processors, second sensor data;

preprocess the second sensor data by filtering the second sensor data to determine whether a second action is a suspected wrist turning action, wherein the suspected wrist turning action is a wrist turning action responsive to a probability being greater than or equal to a preset probability threshold;

responsive to the first action being the preset action, determine, by the one or more processors and based on the second sensor data, whether the user performs a wrist turning action within a preset duration range starting from the first moment, wherein the wrist turning action comprises a post-extension wrist turning action;

responsive to determining that the wrist turning action is performed within the preset duration range, cause a display of the electronic device to display a preset two-dimensional code page;

obtain, by the one or more processors, third sensor data;

process, by the one or more processors, the third sensor data to obtain a third recognition result; and cause the display to display a first page when the third recognition result represents that a third action of the user corresponding to the third sensor data is a post-withdrawal wrist turning action, wherein the first page is a page displayed before the electronic device displays the two-dimensional code page.

* * * * *